(12) United States Patent
Yang et al.

(10) Patent No.: US 11,740,815 B2
(45) Date of Patent: Aug. 29, 2023

(54) INTELLIGENT PATH SELECTION AND LOAD BALANCING

(71) Applicant: Samsung Electronics Co., Ltd., Suwon-si (KR)

(72) Inventors: Zhengyu Yang, San Diego, CA (US); Nithya Ramakrishnan, San Diego, CA (US); Allen Russell Andrews, El Cajon, CA (US); Sudheendra Grama Sampath, San Diego, CA (US); T. David Evans, San Diego, CA (US); Clay Mayers, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/461,809

(22) Filed: Aug. 30, 2021

(65) Prior Publication Data

US 2021/0389891 A1 Dec. 16, 2021

Related U.S. Application Data

(63) Continuation of application No. 16/459,166, filed on Jul. 1, 2019, now Pat. No. 11,144,226.

(Continued)

(51) Int. Cl.
*G06F 3/06* (2006.01)
*G06F 13/40* (2006.01)
*G06F 13/16* (2006.01)

(52) U.S. Cl.
CPC .......... *G06F 3/0635* (2013.01); *G06F 3/0604* (2013.01); *G06F 3/0611* (2013.01);
(Continued)

(58) Field of Classification Search
CPC ............................ G06F 3/0635; G06F 3/0659
See application file for complete search history.

(56) References Cited

U.S. PATENT DOCUMENTS

| 5,592,672 A | 1/1997 | Grewal et al. |
| 6,438,138 B1 | 8/2002 | Kamiya |
| (Continued) | | |

FOREIGN PATENT DOCUMENTS

| CN | 103955422 A | 7/2014 |
| CN | 106254272 A | 12/2016 |
| (Continued) | | |

OTHER PUBLICATIONS snia.org, https://composter.com.ua/documents/SNIASSSIPCIe101WhitePaper1.12013.pdf, "PCIe SSD 101", Jan. 1, 2013, pp. 1-32.

(Continued)

*Primary Examiner* — David E Martinez
(74) *Attorney, Agent, or Firm* — Lewis Roca Rothgerber Christie LLP

(57) ABSTRACT

A method for dispatching input-output in a system. The system may include a centralized processing circuit, a plurality of persistent storage targets, a first input-output processor, and a second input-output processor. The method may include determining whether the first input-output processor is connected to a first target of the plurality of persistent storage targets; determining whether the second input-output processor is connected to the first target; and in response to determining that both the first input-output processor is connected to the first target, and the second input-output processor is connected to the first target, dispatching a first plurality of input-output requests, each to either the first input-output processor or the second input-output processor, the dispatching being in proportion to a service rate of the first input-output processor to the first (Continued)

target and a service rate of the second input-output processor to the first target, respectively.

19 Claims, 40 Drawing Sheets

Related U.S. Application Data

(60) Provisional application No. 62/832,616, filed on Apr. 11, 2019.

(52) U.S. Cl.
CPC .......... *G06F 3/0659* (2013.01); *G06F 3/0673* (2013.01); *G06F 13/1668* (2013.01); *G06F 13/4027* (2013.01)

(56) References Cited

U.S. PATENT DOCUMENTS

| | | | |
|---|---|---|---|
| 6,683,875 B1 | 1/2004 | Byham et al. | |
| 6,986,139 B1 | 1/2006 | Kubo | |
| 7,289,498 B2 | 10/2007 | Yu et al. | |
| 7,448,044 B1 | 11/2008 | Rust et al. | |
| 8,031,729 B2 | 10/2011 | Elzur | |
| 8,589,941 B2 | 11/2013 | Cardona et al. | |
| 8,638,664 B2 | 1/2014 | Shankar et al. | |
| 8,640,128 B2 | 1/2014 | Cardona et al. | |
| 9,021,138 B2 | 4/2015 | Dabagh et al. | |
| 9,152,448 B2 | 10/2015 | Wang et al. | |
| 9,459,904 B2 | 10/2016 | Mehta et al. | |
| 9,571,426 B2 | 2/2017 | Agarwal et al. | |
| 9,785,356 B2 | 10/2017 | Huang | |
| 9,800,523 B2 | 10/2017 | Guan et al. | |
| 9,804,780 B2 | 10/2017 | Oe et al. | |
| 9,979,678 B2 | 5/2018 | Huang et al. | |
| 10,069,903 B2 | 9/2018 | Sorenson, III et al. | |
| 10,089,144 B1 | 10/2018 | Nagpal et al. | |
| 10,127,177 B2 | 11/2018 | Tamir et al. | |
| 10,142,231 B2 | 11/2018 | Vasudevan | |
| 10,637,817 B2 | 4/2020 | Kuo et al. | |
| 10,671,302 B1* | 6/2020 | Aggarwal | G06F 3/0659 |
| 10,757,180 B2 | 8/2020 | Hodges et al. | |
| 10,860,218 B2 | 12/2020 | Graham et al. | |
| 2002/0124104 A1 | 9/2002 | Rappaport et al. | |
| 2003/0076849 A1 | 4/2003 | Morgan et al. | |
| 2005/0138170 A1 | 6/2005 | Cherkasova et al. | |
| 2006/0064497 A1 | 3/2006 | Bejerano et al. | |
| 2006/0161924 A1 | 7/2006 | Di Gregorio | |
| 2008/0216087 A1 | 9/2008 | Dillenberger et al. | |
| 2009/0161684 A1 | 6/2009 | Voruganti et al. | |
| 2010/0157964 A1 | 6/2010 | Yoon | |
| 2011/0044338 A1 | 2/2011 | Stahl et al. | |
| 2011/0142064 A1 | 6/2011 | Dubai et al. | |
| 2011/0153935 A1 | 6/2011 | Li | |
| 2011/0191011 A1 | 8/2011 | McBride et al. | |
| 2012/0072627 A1* | 3/2012 | Droux | G06F 9/505 710/104 |
| 2012/0079495 A1 | 3/2012 | Conti et al. | |
| 2014/0274011 A1 | 9/2014 | Jain et al. | |
| 2014/0325524 A1 | 10/2014 | Zangaro et al. | |
| 2014/0337540 A1 | 11/2014 | Johnson et al. | |
| 2015/0233983 A1 | 8/2015 | Siebel et al. | |
| 2016/0269240 A1* | 9/2016 | Balakrishnan | H04L 67/61 |
| 2016/0301610 A1 | 10/2016 | Amit et al. | |
| 2017/0031610 A1* | 2/2017 | Regester | G06F 11/3433 |
| 2017/0083252 A1 | 3/2017 | Singh et al. | |
| 2017/0168715 A1 | 6/2017 | Eshwarappa et al. | |
| 2017/0315840 A1 | 11/2017 | Yu et al. | |
| 2018/0131718 A1 | 5/2018 | Chien | |
| 2018/0191867 A1 | 7/2018 | Siebel et al. | |
| 2018/0285021 A1 | 10/2018 | Akaike et al. | |
| 2018/0349026 A1 | 12/2018 | Richter et al. | |
| 2018/0349300 A1 | 12/2018 | Bubb et al. | |
| 2018/0359318 A1 | 12/2018 | Rogers et al. | |
| 2019/0042326 A1 | 2/2019 | Chilikin et al. | |
| 2019/0042331 A1 | 2/2019 | McDonnell et al. | |
| 2019/0042388 A1 | 2/2019 | Wang et al. | |
| 2019/0095491 A1 | 3/2019 | Bhattacharjee et al. | |
| 2019/0163764 A1 | 5/2019 | Ioannou et al. | |
| 2019/0182316 A1 | 6/2019 | Hodges et al. | |
| 2019/0196969 A1 | 6/2019 | Yang et al. | |
| 2019/0354406 A1 | 11/2019 | Ganguli et al. | |
| 2020/0162385 A1 | 5/2020 | Thiagarajan et al. | |

FOREIGN PATENT DOCUMENTS

| | | |
|---|---|---|
| CN | 107741878 A | 2/2018 |
| CN | 109074269 A | 12/2018 |
| JP | 6289631 | 2/2018 |
| WO | WO 2014050125 A1 | 4/2014 |

OTHER PUBLICATIONS

Mohammad Hedayati, et al., "Multi-Queue Fair Queuing", Department of Computer Science, University of Rochester Google Inc Technical Report #1005, Oct. 1, 2018, pp. 1-13, https://pdfs.semanticscholar.org/abd0/a302926f66268541a3cbb392b79fde7b4ecf.pdf.

Ann Klimovic, et al., "ReFlex: Remote Flash ≈ Local Flash", ASPLOS '17, Apr. 8-12, 2017, Xi'an, China Jul. 12, 2017, pp. 1-15, http://web.stanford.edu/group/mast/cgibin/drupal/system/files/reflex_asplos17.pdf.

John Kim, et al. "How Ethernet RDMA Protocols iWARP and RoCE Support NVMe over Fabrics", https://www.snia.org/forums/nsf/knowledge/webcasts, Jan. 26, 2016, pp. 1-34.

Wenyu Gao, Jianxin Wang, Jianer Chen and Songqiao Chen, "PFED: a prediction-based fair active queue management algorithm," 2005 International Conference on Parallel Processing (ICPP'05), Oslo, Norway, 2005, pp. 485-491, doi: 10.1109/ICPP.2005.63 (Year: 2005).

Allen B. Downey, "Using Queue Time Predictions for Processor Allocation", EECS Department University of California, Berkeley, Technical Report No. UCB/CSD-97-929 (Year: 1997).

Guan, L. , Awan, I.U. , Phillips, L. , Grigg, A. , Dargie, W. (2009). "Performance analysis of a threshold-based discrete-time queue using maximum entropy". Simulation Modelling Practice and Theory. 17, 558-568 (Year: 2009).

Hu, Q., Sun, Y. & Han, J. An efficient scheduling algorithm for input-queued switches. J. of Electron.(China) 24, 251-256 (2007). https://doi .org/10.1007/s11767-006-0111-8 (Year: 2007).

Yuan Sun, Qingsheng Hu, Jiangtao Han and Zhigong Wang, "A self-adaptive threshold based scheduling algorithm for input-queued switches," 2006 Workshop on High Performance Switching and Routing, Poznan, 2006, pp. 4 pp. -, doi: 10.1109/ H PSR.2006. 17097 41. (Year: 2006).

A. K. Choudhury and E. L. Hahne, "Dynamic queue length thresholds for shared-memory packet switches," in IEEE/ACM Transactions on Networking, vol. 6, No. 2, pp. 130-140, Apr. 1998, doi: 10.1109/90.664262. (Year: 1998).

H. Li and T. Yang, "Queues with a variable number of servers," European Journal of Operational Research, vol. 124, No. 3, pp. 615-628, 2000. (Year: 2000).

H. Xiao and G. Zhang, "The queuing theory application in bank service optimization," 2010 International Conference on Logistics Systems and Intelligent Management (ICLSIM), Harbin, 2010, pp. 1097-1100, doi: 10.1109/ICLSIM.2010.5461127. (Year: 2010).

U.S. Office Action dated Jul. 28, 2020, issued in U.S. Appl. No. 16/536,928, 26 pages.

Office Action issued in U.S. Appl. No. 16/706,161 by the USPTO, dated Sep. 3, 2020, 9 pages.

U.S. Final Office Action dated Nov. 13, 2020, issued in U.S. Appl. No. 16/536,928 (27 pages).

U.S. Advisory Action dated Feb. 8, 2021, issued in U.S. Appl. No. 16/536,928 (6 pages).

J.S. Chase, D.C. Anderson, P.N. Thakar, A.M. Vahdat, R.P. Doyle, Managing energy and server resources in hosting centers, in:

(56) References Cited

OTHER PUBLICATIONS

Proceedings of the 18th ACM Symposium on Operating Systems Principles, ACM, New York, NY, USA, 2001, pp. 103-116 (Year: 2001).

M. Mazzucco, D. Dyachuk and M. Dikaiakos, "Profit-Aware Server Allocation for Green Internet Services," 2010 IEEE International Symposium on Modeling, Analysis and Simulation of Computer and Telecommunication Systems, Miami Beach, FL, USA, 2010, pp. 277-284, doi: 10.1109/MASCOTS.2010.36. (Year: 2010).

U.S. Final Office Action dated Feb. 18, 2021, issued in U.S. Appl. No. 16/706,161 (10 pages).

U.S. Office Action dated Mar. 2, 2021, issued in U.S. Appl. No. 16/536,928, (30 pages).

Chinese Notice Of Allowance dated Jun. 13, 2022, issued in corresponding Chinese Patent Application No. 202010095602.5 (5 pages).

\* cited by examiner

| # | Terminology | Description |
|---|---|---|
| 1 | RDMA | Remote Direct Memory Access. |
| 2 | RoCE | RDMA over Converged Ethernet. |
| 3 | NUMA | Non-Uniform Memory Access. |
| 4 | NQN | NVMe Qualified Name, list of Target (storage server) ID(s). |
| 5 | NVMe | Non-Volatile Memory Express. |
| 6 | NVMeoF | NVMe over Fabrics. |
| 7 | Namespace | A quantity of NVMe SSDs that can be formatted into logical blocks. |
| 8 | NIC | Network Interface Controller. |

*Fig. 2-1T*

| # | Level | Dispatch from | Dispatch to | Module(s) in Charge | Considers |
|---|---|---|---|---|---|
| 1 | First-level | User Application's Centralized Queue (UA_CQ) | NUMA-NIC path in the system (NUMA_CQs). | Subsystem 1 Component 1 | Cross-NUMA bridge performance penalty and gain, NUMA core service rate, and NIC-target connection. |
| 2 | Second-Level | NUMA's Centralized Queue (NUMA_CQ) | NIC ports in each NUMA NIC set (NIC_CQs). | Subsystem 1 Component 2 | NIC-target connection, and NIC-target bandwidth. |
| 3 | Third-Level | NIC Port's Centralized Queue (NIC_CQ) | Queue Pairs in each NIC port (QPs). | Subsystem 2 Components 3, 4 and 5 | Queue pair workload status, incoming I/O workload spike degree, and different strategies for load balancing. |

*Fig. 2-4T*

| # | Challenges | Design Goals |
|---|---|---|
| 1 | Cross-bridge communication bottlenecks the performance significantly. | Reduce overhead by avoiding using the bridge or use it carefully. |
| 2 | NUMAs may have different connection setups (some targets are not reachable from some NUMAs). | Find a direct path through the "reachable" NUMA's NIC or indirect path from the "non-reachable" NUMA through the bridge and the "reachable" NUMA's NIC. |
| 3 | Workloads imbalance among NUMAs may lead to resource waste and long backlogs. | Balance load among all NUMA paths (here we focus on balancing NUMA paths and NIC ports of each NUMA, not Queue Pairs inside each NIC, which will be presented in Section 4). |
| 4 | Some NUMAs cannot reach the Target may be idled and wasted. | Fully utilize idled NUMAs with the consideration of cross-bridge overhead. |

*Fig. 3-1T*

| # | Component | Function |
|---|---|---|
| 1 | Component 1: NUMA-NIC Path Selector | Comprehensively selects NUMA paths for each I/O request based on its "Target Map", NUMA capability, NUMA-target connection, and cross-bridge performance gain and penalty. The NUMA-level path selection results will be sent to Component 2. |
| 2 | Component 2: NIC Load Balancer | Once each NUMA receives the NUMA-level path selection results, Component 2 further balances the loads across NIC ports of each NUMA. |

*Fig. 3-2T*

| # | Symbols | Description |
|---|---|---|
| 1 | $\mu_N$ | NUMA core service rate. Service rate of NUMA N (including CPU and Memory on NUMA N). There are two NUMAs, $N$ and $\overline{N}$. So $N$ here can be replaced by $\overline{N}$ if referring to the other NUMA. |
| 2 | $\mu_{N \to T}$ | NUMA path service rate: Service rate of the I/O path from NUMA N to Target T, whose calculation can be seen in the following Subsections. |
| 3 | $\mu_{N \to n \to T}$ | Single NUMA NIC port service rate: Service rate of one single I/O path from NUMA N through NIC n to Target T. If the NIC port n cannot reach the Target T, then the service rate is zero. |
| 4 | $\Psi(N)$ | Set of NIC ports of NUMA N. |
| 5 | $\sum_{n \in \Psi(N)} \mu_{N \to n \to T}$ | NUMA NIC total service rate: Total service rate of one single I/O path from NUMA N through all its NIC ports to Target T. |
| 6 | $\mu_B$ | Cross-bridge service rate. Usually, a bridge (B) connects two NUMAs, so we use N and N bar to indicate these two NUMAs. |

Fig. 3-3AT

| # | Symbols | Description |
|---|---|---|
| 7 | $\mu_{N \to B \to T}$ | Service rate of the path from NUMA N via bridge B and NUMA N bar's NICs to Target T. |
| 8 | $\mu_{Out \to B \to T}$ | Service rate of the path from NUMA Out (unreachable to Target T) via bridge B and NUMA In (reachable to Target T). |
| 9 | $\epsilon$ | Penalty (to target-reachable NUMA's service rate) function of bridge resource usage. This function can be regressed during runtime. |
| 10 | $\rho$ | The percentage of the service rate of the target-reachable NUMA's NIC resource is used by the target-unreachable NUMA. Notice that it is designed for the case when the bridge is used. |
| 11 | $\mu_{\Sigma B}$ | The overall service rate of the entire NUMA systems (i.e., including two NUMAs and two NICs) when the bridge is used. |
| 12 | $\mu_{\Sigma NB}$ | The overall service rate of the entire NUMA systems (i.e., including two NUMAs and two NICs) when the bridge is not used. |

*Fig. 3-3BT*

Algorithm 1: Main Procedures of Subsystem 1

1  Procedure Subsystem_1_NUMA-Aware_Path_Selector()
2      sel = Component_1_NUMA - NIC_Path_Selector();
3      bal = Component_2_NIC_Load_Balancer();
4      sel.getStream();
5      sel.dispatch();
6  Procedure Component_1_NUMA-NIC_Path_Selector.dispatch()
7      $\mu_M \rightarrow T = \min(\mu_M^T \Sigma_{qew}(M)(\mu_M \rightarrow n \rightarrow T));$
8      $\mu_N \rightarrow T = \min(\mu_N^T \Sigma_{qew}(N)(\mu_N \rightarrow n \rightarrow T));$
9      if $(\mu_M \rightarrow T == 0)$ AND $(\mu_N \rightarrow T == 0)$ then
10       return error("target is not reachable.");
11     else if $(\mu_M \rightarrow T \neq 0)$ AND $(\mu_M \rightarrow T \neq 0)$ then
12       bal.dispatch($\lambda, M, T, \frac{\mu_M \rightarrow T + \mu_N \rightarrow T}{\mu_M \rightarrow T + \mu_N \rightarrow T}, 0$);
13       bal.dispatch($\lambda, N, T, \frac{\mu_N \rightarrow T}{\mu_M \rightarrow T + \mu_N \rightarrow T}, 0$);
14     else if $(\mu_M \rightarrow T == 0)$ OR $(\mu_N \rightarrow T == 0)$ then
15       $(\mu_M \rightarrow T == 0)?(In = N, Out = M):(In = M, Out = N);$
16       $\mu'_{2NB}$ = calNoBridgeTtlServRate(In);
17       $(\mu'_B, \rho)$ = calWseBridgeTtlServRate(In, Out);
18       if $\mu'_{2NB} < \mu'_B$ then
19         bal.dispatch($\lambda, B, T, 1, 0$);
20         return;

*Fig. 3-4A*

```
21          else
22              bal.dispatch(λ, M, T, ρ, 1);
23              bal.dispatch(λ, M, T, 1 − ρ, 0);
24          return;
25  Procedure Component_1_NUMA-NIC_Path_Selector.callNoBridgeTtlServRate (N)
26      return min(μ_N, Σ_{n∈N}(μ_N)(μ_B → n → T));
27  Procedure Component_1_NUMA-NIC_Path_Selector.callUseBridgeTtlServRate (In, Out)
28      μ_Out → B → T = min(μ_Out, μ_B, ρ * Σ_{n∈N}(μ_n)(μ_In → n → T));
29      ε = calPenalty(μ_Out → B → T, In, Out);
30      μ_ΣLB = μ_Out → B → T + min(μ_In − ε, (1 − ρ) * Σ_{n∈N}(μ_In)(μ_In → n → T));
31      return {max_{q∈[0,1]}(μΣB), ρ∈[0,1](μΣB)};
32  Procedure Component_2_NIC_Load_Balancer.dispatch (λ, M, T, ρ, β)
33      IOStream = λ;
34      NUMA_ID = M;
35      Target_ID = T;
36      IOSize = λ * ρ;
37      strategy = RoundRobin;
38      useBridge = β;
39      result = (NUMA_ID, Target_ID, IOStream, IOSize, strategy, useBridge);
40      Subsystem_2.receiveRequest(result);
41      return;
```

*Fig. 3-4B*

| # | Input Parameters | Meaning |
|---|---|---|
| 1 | $\lambda$ | Incoming stream's arrival rate. |
| 2 | $N$ | NUMA ID. |
| 3 | $T$ | Target ID. |
| 4 | $\beta$ | The flag indicates whether to use the bridge (1=use, 0=do not use). |

*Fig. 3-4T*

| # | Input Parameters | Meaning |
|---|---|---|
| 1 | $\mu_{Out \to B \to T}$ | The service rate of the target-unreachable NUMA path (the left path), which in fact reflects the used bandwidth of the bridge. |
| 2 | *In* | NUMA ID. |
| 3 | *Out* | Target ID. |

*Fig. 3-5T*

| # | Component | Function |
|---|---|---|
| 1 | Component 3: Workload Spike Detector | Detects the spike degree of current incoming I/Os from the NIC's Centralized Queue (i.e., NIC_CQ, not "UA_CQ" mentioned in Subsection 4.1.1) to the Client Stack Queue Pairs of that NIC port. |
| 2 | Component 4: Queue Pairs Load Monitor | Collects load status information of Queue Pair of the current NIC port in the Client Stack (e.g., number of Queue Pairs, number of I/O requests, even each request's actual workload amount if needed, etc). |
| 3 | Component 5: Queue Pairs Load Balancer | Based on the results obtained from Component 3 and 4, it dispatches I/O requests among the Client Stack Queue Pairs, in order to balance the load and improve system utilization. |

*Fig. 4-1T*

| # | Parameter | Description |
|---|---|---|
| 1 | IO_pkt_struct | I/O request is an instanced struct containing a key and a value object. |
| 2 | key_ptr | A pointer to a key. |
| 3 | value_struct | An instanced value struct of the storage object. |
| 4 | value_ptr | A pointer to the storage object, such as a file. |
| 5 | value_size | The size of the storage object, such as the file size. |
| 6 | length | The I/O size of the file. Notice that we may read/write the entire file (length = value_size), or read/write part of the file (length < value_size). |
| 7 | offset | Start address of the file. |
| 8 | operation | I/O operations such as read, write, delete, etc. |

*Fig. 4-2T*

| # | Epoch window name | Codes | Description |
|---|---|---|---|
| 1 | Strategy update window (W_SU) | strategyUpdateWindow | A preset frequency for updating strategy as well as conducting detection workload spike degree. |
| 2 | Queue status updating window (W_QSU) | queueStatusUpdateWindow | A preset frequency for updating status of Queue Pairs in the NIC port. |

*Fig. 4-3T*

| # | Symbols | Description |
|---|---|---|
| 1 | $\tau_{<i,q>}$ | Actual workload amount of I/O request i in Queue Pair q. The total makespan of the I/O. |
| 2 | $s_i$ | I/O size of I/O request i. |
| 3 | $v_i$ | Operation type of I/O request i, e.g., read, write, delete, etc. |
| 4 | $\mu_{<i,q>}$ | Queue Pair q's Service Rate for I/O request i's operation type. |
| 5 | $\ell_q$ | Total actual workload amount of all I/O requests queued in the Queue Pair q. |
| 6 | $\{q\}$ | Set of queued I/O requests in the Queue Pair q. |
| 7 | $q, c$ | Queue Pair q, and Centralized Queue c in each NIC port. Notice that this c is NIC_CQ, not the User Application Layer (UA_CQ). |

*Fig. 4-3AT*

| # | Symbols | Description |
|---|---|---|
| 8 | $\lvert q \rvert, \lvert c \rvert$ | The number of I/O requests that are queued in the Queue Pair q, and Centralized Queue c in NIC port (NIC_CQ). |
| 9 | $\lvert q \rvert_{max}, \lvert c \rvert_{max}$ | The preset maximal size of Queue Pair q and Centralized Queue c in NIC port, respectively. |
| 10 | $\ell_{<q,k,i>}$ | Total actual workload amount of all I/O requests queued in the Queue Pair q, when the new I/O request i is assigned to Queue Pair k. Notice that k may be the same or not the same as Queue Pair q, thus it is a piecewise function. |
| 11 | $\overline{\ell_{<Q,k,i>}}$ | Mean total actual workload amount of all I/O requests queued in all Queue Pairs in the Queue Pair set Q if the new I/O request i is assigned to Queue Pair k. |

*Fig. 4-3BT*

| # | Symbols | Description |
|---|---|---|
| 12 | $Q$ | The set of Queue Pairs in the current NIC port. |
| 13 | $N_q$ | The number of queue pairs in the NIC port. |
| 14 | $Q_{<Q,k,i>}$ | The coefficient of variation (CV) of total workload amount of each Queue Pairs in the NIC port. This value reflects the balance degree, e.g., the larger CV is, the more imbalance across Queue Pairs it is. |
| 15 | $SCV$ | Squared-coefficient of variation. |
| 16 | $\eta$ | Spike degree, or index of dispersion. The bigger it is, the higher the spike degree is. |
| 17 | $\theta$, $\theta_{max}$ | An iterating lag's value and the preset maximal lag value (usually to be very large or even infinity) for auto-correlation function as shown in Eq. 4-3. |

*Fig. 4-3CT*

| # | Symbols | Description |
|---|---|---|
| 18 | $\sigma$ | The variance of the NIC Centralized Queue (NIC_CQ) queued I/O number. We assume that the arrival distribution follows a wide-sense stationary process which means it is a time-independent process. |
| 19 | $\varphi$ | A knob to tune the weight of autocorrelation results, usually we can set it to 2 or 3. |
| 20 | $|C|_t$, $|C|_{t+\theta}$ | NIC Centralized Queue (NIC_CQ) queued job numbers at time $t$ and $t + \theta$ respectively. |
| 21 | $\overline{|C|_t}$, $\overline{|C|_{t+\theta}}$ | Mean value of NIC Centralized Queue (NIC_CQ) queued job numbers at time $t$ and $t+\theta$, respectively. |

*Fig. 4-3DT*

Algorithm 2: Main Procedures of Subsystem 2

```
1  Procedure Subsystem_2_Queue_Pairs_Load_Balancing_Dispatcher()
2      receiveRequest(request);
3      mnt = Component_3_Queue_Pairs_Load_Monitor();
4      det = Component_4_Workload_Spike_Detector();
5      bal = Component_5_Queue_Pairs_Load_Balancer;
6      while (results≠∅) do
7          if mnt.getQPNum()==1 then
8              strategy=sentAllToOneQP;
9          else
10             if (curTime mod strategyUpdateWindow==0) then
11                 spikeDeg = det.getCurSpikeDeg();
12                 if(spikeDeg == highSpike) then
13                     strategy = roundRobin;
14                 else if (spikeDeg == midSpike) then
15                     strategy = JSQ;
16                 else if (spikeDeg == lowSpike) then
17                     strategy = minCV;
18         bal.dispatch(request,strategy);
```

*Fig. 4-4A*

```
19 Procedure Component_5_Queue_Paris_Load_Balancer (request, strategy)
20   if (strategy == sendAllToOneQP) then
21     q = getQueuePair();
22     send(request,q);
23     return;
24   if (strategy == roundRobin) then
25     q = getQueuePairRoundRobin(lastQueueID);
26     send(request,q);
27     return;
28   if (currTime mod queueStatusUpdateWindow == 0) then
29     queueStatus = mnt.getQueueStatus();
30   if (strategy == JSQ) then
31     q = getQueuePairJSQ(queueStatus.actualWorkloadAmount);
32     send(request,q);
33     return;
34   else if (strategy == minCV) then
35     q = getQueuePairMinCV(queueStatus.actualWorkloadAmount);
36     send(request,q);
37     return;
```

*Fig. 4-4B*

INTELLIGENT PATH SELECTION AND LOAD BALANCING

CROSS-REFERENCE TO RELATED APPLICATION(S)

This application is a continuation of U.S. patent application Ser. No. 16/459,166, filed Jul. 1, 2019, which claims priority to and the benefit of U.S. Provisional Application No. 62/832,616, filed Apr. 11, 2019, entitled "INTELLIGENT PATH SELECTION AND LOAD BALANCING (NVMEPL) FOR I/O TRANSMISSIONS FROM AN NVMEOF INITIATOR TO A MULTI-PATH", the entire content of all of which is incorporated herein by reference.

FIELD

One or more aspects of embodiments according to the present disclosure relate to data storage, and more particularly to a system and method for intelligent path selection and load balancing.

BACKGROUND

In a computing system with a plurality of persistent storage targets, there may be multiple paths by which input-output requests may be dispatched to any one of the targets. The input-output throughput of the system may depend on how these paths are selected, for each of a plurality of input-output requests to be dispatched.

Thus, there is a need for a system and method for intelligent path selection and load balancing.

SUMMARY

According to an embodiment of the present invention, there is provided a method for dispatching input-output, the method including: determining whether a first input-output processor is connected to a first target of a plurality of persistent storage targets; determining whether a second input-output processor is connected to the first target; and in response to determining that the first input-output processor is connected to the first target, and the second input-output processor is connected to the first target, dispatching a first plurality of input-output requests, each to either the first input-output processor or the second input-output processor, the dispatching being in proportion to a service rate of the first input-output processor to the first target and a service rate of the second input-output processor to the first target, respectively.

In some embodiments, the first input-output processor and the second input-output processor are connected by a bridge, the method further including: in response to determining that the first input-output processor is connected to the first target; and the second input-output processor is not connected to the first target, estimating a first service rate, for a configuration in which input-output requests are dispatched to only the first input-output processor; estimating a second service rate, for a configuration in which input-output requests are dispatched to both the first input-output processor and the second input-output processor; determining whether the first service rate exceeds the second service rate; in response to determining that the first service rate exceeds the second service rate, dispatching a second plurality of input-output requests to the first input-output processor, and in response to determining that the first service rate does not exceed the second service rate: dispatching a first subset of a third plurality of input-output requests to the first input-output processor, and dispatching a second subset of the third plurality of input-output requests to the second input-output processor.

In some embodiments, the estimating of the second service rate includes: finding a maximum value of a service rate function over an adjustable parameter, the adjustable parameter being a fraction of input-output requests to be dispatched to the second input-output processor, the service rate function being a model of a total service rate to the first target.

In some embodiments, the service rate function is a function of a penalty function, the penalty function being a function for estimating a reduction in service rate from the first input-output processor directly to the first target as a result of routing of input-output requests: through the second input-output processor, through the bridge, and through the first input-output processor, to the first target.

In some embodiments, the finding of the maximum value includes using a gradient descent method.

In some embodiments, the penalty function is a polynomial function.

In some embodiments, the penalty function is a linear function.

In some embodiments, the method further includes: in response to determining that the first input-output processor is not connected to the first target; and the second input-output processor is not connected to the first target, returning an error message.

In some embodiments, the first input-output processor includes a first network interface card and a second network interface card, the method further including dispatching a first input-output request of the first plurality of input-output requests and a second input-output request of the first plurality of input-output requests to the first network interface card and the second network interface card in a round robin sequence.

In some embodiments, the first input-output processor includes a first network interface card including a first queue pair and a second queue pair, the method further including estimating a workload spike degree, the workload spike degree being a measure of workload of the first network interface card according to centralized queue job numbers of the first network interface card, and selecting a strategy for assigning each incoming input-output request to a respective queue pair of the first network interface card.

In some embodiments, the estimating of the workload spike degree includes calculating the workload spike degree according to:

$$\eta = SCV\left(1 + \alpha \sum \frac{E[(|c|_{t+\theta} - \overline{|c|_{t+\theta}}) \cdot (|c|_t - \overline{|c|_t})]}{\sigma^2}\right)$$

wherein: $|c|_t$ and $|c|_{t+\theta}$ are centralized queue queued job numbers at time t and t+θ respectively, $\overline{|c|_t}$ and $\overline{|c|_{t+\theta}}$ are mean centralized queue queued job numbers at time t and t+θ respectively, and SCV is a squared coefficient of variation.

In some embodiments, the method further includes: determining whether the workload spike degree exceeds a first threshold, estimating a length of the first queue pair, and in response to determining that the workload spike degree exceeds a first threshold: assigning each incoming input-output request to queue pairs in the first network interface card in a round robin sequence.

In some embodiments, the method further includes: determining whether the workload spike degree exceeds a second threshold, the second threshold being less than the first threshold, estimating a length of the first queue pair, estimating a length of the second queue pair, in response to determining that the workload spike degree does not exceed the first threshold and that the workload spike degree exceeds the second threshold: assigning an incoming input-output request to a shorter one of the first queue pair and the second queue pair.

In some embodiments, the estimating the length of the first queue pair includes estimating the length of the first queue pair based on a number of input-output requests in the first queue pair.

In some embodiments, the estimating of the length of the first queue pair includes estimating the length of the first queue pair based on an actual workload amount in the first queue pair.

According to an embodiment of the present invention, there is provided a system including: a centralized processing circuit, a plurality of persistent storage targets, a first input-output processor, and a second input-output processor, the centralized processing circuit being configured to: determine whether the first input-output processor is connected to a first target of the plurality of persistent storage targets; determine whether the second input-output processor is connected to the first target; and in response to determining that the first input-output processor is connected to the first target, and the second input-output processor is connected to the first target, dispatch a first plurality of input-output requests, each to either the first input-output processor or the second input-output processor, the dispatching being in proportion to a service rate of the first input-output processor to the first target and a service rate of the second input-output processor to the first target, respectively.

In some embodiments, the system further includes a bridge connecting the first input-output processor and the second input-output processor, wherein the centralized processing circuit is further configured to: in response to determining that the first input-output processor is connected to the first target; and the second input-output processor is not connected to the first target, estimate a first service rate, for a configuration in which input-output requests are dispatched to only the first input-output processor; estimate a second service rate, for a configuration in which input-output requests are dispatched to both the first input-output processor and the second input-output processor; determine whether the first service rate exceeds the second service rate; in response to determining that the first service rate exceeds the second service rate, dispatch a second plurality of input-output requests to the first input-output processor, and in response to determining that the first service rate does not exceed the second service rate: dispatch a first subset of a third plurality of input-output requests to the first input-output processor, and dispatch a second subset of the third plurality of input-output requests to the second input-output processor.

In some embodiments, the estimating of the second service rate includes: finding a maximum value of a service rate function over an adjustable parameter, the adjustable parameter being a fraction of input-output requests to be dispatched to the second input-output processor, the service rate function being a model of a total service rate to the first target.

In some embodiments, the service rate function is a function of a penalty function, the penalty function being a function for estimating a reduction in service rate from the first input-output processor directly to the first target as a result of routing of input-output requests: through the second input-output processor, through the bridge, and through the first input-output processor, to the first target.

According to an embodiment of the present invention, there is provided a method for dispatching input-output in a system, the system including: centralized means for processing, a plurality of persistent storage targets, a first input-output processor, and a second input-output processor, the method including: determining whether the first input-output processor is connected to a first target of the plurality of persistent storage targets; determining whether the second input-output processor is connected to the first target; in response to determining that both the first input-output processor is connected to the first target, and the second input-output processor is connected to the first target, dispatching a first plurality of input-output requests, each to either the first input-output processor or the second input-output processor, the dispatching being in proportion to a service rate of the first input-output processor to the first target and a service rate of the second input-output processor to the first target, respectively.

BRIEF DESCRIPTION OF THE DRAWINGS

These and other features and advantages of the present disclosure will be appreciated and understood with reference to the specification, claims, and appended drawings wherein:

FIG. 2-1 is a diagram of an overall I/O Path, according to an embodiment of the present disclosure;

FIG. 2-1T is a table of terminology, according to an embodiment of the present disclosure;

FIG. 2-2 is a diagram of a NUMA system in NVMeoF Abstract Device Interface Layer, according to an embodiment of the present disclosure;

FIG. 2-3 is a diagram of an example of a "Target Map", according to an embodiment of the present disclosure;

FIG. 2-4 is a diagram of a Workflow of assignment of three-level dispatch based on whether NUMA is supported, according to an embodiment of the present disclosure;

FIG. 2-4T is a table of differences between three-level dispatches, according to an embodiment of the present disclosure;

FIG. 2-5 is a diagram of an example of two NUMAs and each of them has three NICs, according to an embodiment of the present disclosure;

FIG. 3-1T is a table of challenges and design goals, according to an embodiment of the present disclosure;

FIG. 3-1 is a diagram of a queueing model of a dual-NUMA system, according to an embodiment of the present disclosure;

FIG. 3-2 is a diagram of all four possible I/O paths, according to an embodiment of the present disclosure;

FIG. 3-2T is a table of component and functions in Subsystem 1, according to an embodiment of the present disclosure;

FIGS. 3-3AT and 3-3BT are a table of symbols and descriptions used in bottleneck-based service rate analysis and modeling, according to an embodiment of the present disclosure;

FIGS. 3-3 is a diagram of a workflow of NUMA Path Selection Algorithm, according to an embodiment of the present disclosure;

FIGS. 3-4A and 3-4B are a listing of Main Procedures of NUMA Path Selection Algorithm, according to an embodiment of the present disclosure;

FIG. 3-4T is a table of inputs of a dispatch function, according to an embodiment of the present disclosure;

FIG. 3-5 is a diagram of a an example of Case 1 where neither of two NUMAs can reach targets in Target Group 2, according to an embodiment of the present disclosure;

FIG. 3-5T is a table of inputs of a penalty function, according to an embodiment of the present disclosure;

FIG. 3-6 is a diagram of a queueing model of Case 1 where neither of two NUMAs can reach target T, according to an embodiment of the present disclosure;

FIG. 3-7 is a diagram of an example of Case 2, where both of two NUMAs can reach targets in Target Group 2, according to an embodiment of the present disclosure;

FIG. 3-8 is a diagram of a queueing model of Case 2 where both of two NUMAs can reach target T, according to an embodiment of the present disclosure;

FIG. 3-9 is a diagram of an example of Case 3 where only one NUMA can reach targets in Target Group 2, according to an embodiment of the present disclosure;

FIG. 3-10 is a diagram of Case 3(a): Queueing model of the case that only one NUMA can reach target T, and the system for path selection and load balancing does use the bridge and the target-unreachable;

FIG. 3-11 is a diagram of Case 3(b): Queueing model of the case that only one NUMAs can reach target T, and the system for path selection and load balancing does not use the bridge and the target-unreachable NUMA, according to an embodiment of the present disclosure;

FIG. 4-1T is a table of Components and Functions in Subsystem 2, according to an embodiment of the present disclosure;

FIG. 4-1 is a diagram of an example of Queue Pairs Model and Corresponding Location in Hardware Stacks, according to an embodiment of the present disclosure;

FIG. 4-2T is a table of an I/O request struct description, according to an embodiment of the present disclosure;

FIG. 4-2 is a diagram of a Data Structure of I/O Request, according to an embodiment of the present disclosure;

FIG. 4-3T is a table of epoch windows and their functions, according to an embodiment of the present disclosure;

FIG. 4-3 is a diagram of a detailed workflow of three Components, according to an embodiment of the present disclosure;

FIGS. 4-4A and 4-4B are a listing of a main Procedure of Subsystem 2, according to an embodiment of the present disclosure;

FIGS. 4-3AT-4-3DT are a table of terminology and meanings that are used in the following subsections, according to an embodiment of the present disclosure;

FIG. 4-5 is a diagram of an example of spike detection, according to an embodiment of the present disclosure; and FIG. 4-6 is a diagram of an Workload spike detector and different strategies, according to an embodiment of the present disclosure.

DETAILED DESCRIPTION

Figure 1:
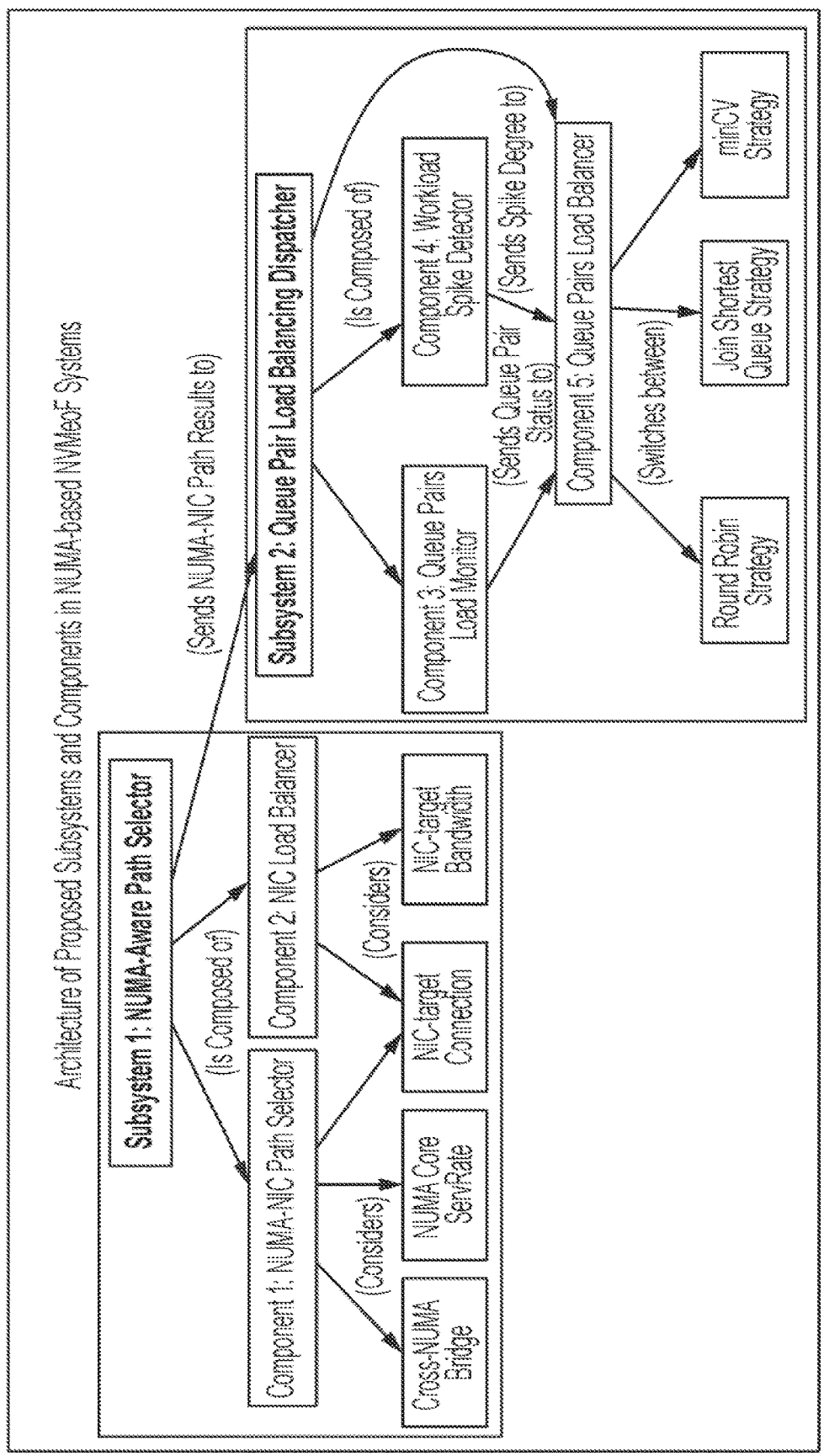
FIG. 1-1 is a diagram of a subsystem and component architecture of a system for path selection and load balancing for NUMA-based NVMeoF systems, according to an embodiment of the present disclosure.

The detailed description set forth below in connection with the appended drawings is intended as a description of exemplary embodiments of a system and method for intelligent path selection and load balancing provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

1. Introduction

Some embodiments provide a comprehensive and full solution for optimizing the I/O performance by intelligent path selection and load balancing for I/O transmissions from an NVMeOF (Non-Volatile Memory Express over Fabrics) initiator to multi-paths in both NUMA(Non-Uniform Memory Access)-based systems.

Some embodiments are motivated by the major problem of current NVMeoF implementation in both NUMA and non-NUMA systems—NUMA resource is not fully utilized, because of the following reasons:

(1) I/O workloads are not balanced across NUMAs based on NUMA-NIC(Network Interface Cards)—Target connection and corresponding capability (e.g., service rate and bandwidth);

(2) Usage of cross-NUMA bridge is costly, but may also help to improve the performance by using the bridge to utilize NUMA that is not directly connected to the Target. However, some NVMeoF implementations either use bridge without consideration of performance penalty; or (ii) do not use the bridge at all and idling the other NUMAs that are not connected with the preferred Target, which in fact ignores the potential performance gain;

(3) I/O requests that are assigned to NICs of each NUMA are not balanced, which may cause resource saturation on some NICs and resource waste on other NICs;

(3) Each NUMA NIC has one or multiple Queue Pairs connecting to it or their counterparts (Queue Pair(s)) in the NIC of Target. Some implementations of NVMeoF do not balance loads across Queue Pairs in each NIC with the consideration of different characteristics of actual workloads of both new I/O requests and queued-in-Queue-Pairs I/O requests;

(4) I/O workload traffic varies across different types of applications, and even I/Os from one single application may also vary during runtime. Some NVMeoF solutions do not consider the change of I/O traffic and the corresponding impacts on load balancing; e.g., during spike time, queue status may be easily out-of-date which may mislead to dispatch all I/Os to a Queue Pair that "used to be with low workload" and eventually saturate that Queue Pair while idling others. As used herein "I/O requests", or "input-output requests", or simply "I/O's" are instructions such as NVMe read and write commands that may be sent to a target. As used herein, a "target", or "Target", or "persistent storage target" is a persistent storage device such as a hard drive or a solid state drive (SSD).

Therefore, the goal of some embodiments is to provide better I/O performance by: (1) building multi-path support to fully utilize all NUMAs, and (2) balancing loads across NUMAs, NICs inside each NUMA and Queue Pairs inside each NIC with the consideration of path capacity, connection, and workload characteristics.

In detail, as shown in FIG. 1-1, there are two subsystems in some embodiments: "Subsystem 1: NUMA-Aware Path Selector" and "Component 2: NIC Load Balancer". The first subsystem is responsible for selecting NUMA-NIC path for I/O request streams (i.e., Component 1) and balancing the loads across NICs in the selected NUMA (i.e., Component 2). These components consider factors like cross-NUMA bridge tradeoff, NUMA core service rate, NIC-target connection, and NIC-target bandwidth. The NUMA-NIC path result of Subsystem 1 will be sent to Subsystem 2, which will further dispatch these assigned I/O requests across Queue Pairs inside each NIC. Component 3 is called to gather the Queue Pair workload status information, and Component 4 is used to monitor the I/O traffic spike degree, which further guides Component 5 to switch between different load balancing strategies. Each NUMA may process I/O requests, and, as such, may be referred to as an "input-output processor".

2. System Architecture Overview

In this Section, we first introduce the overall I/O path of some embodiments, followed by the hardware and software architectures of the system for path selection and load balancing, or "NVMePL". In the end, we briefly introduce the three-level dispatches and corresponding two subsystems and five supportive components in the system for path selection and load balancing. Details of these two subsystems and five components are described in Sections 3 and 4.

2.1 Overall I/O Path of Some Embodiments

Figures 1, 2:
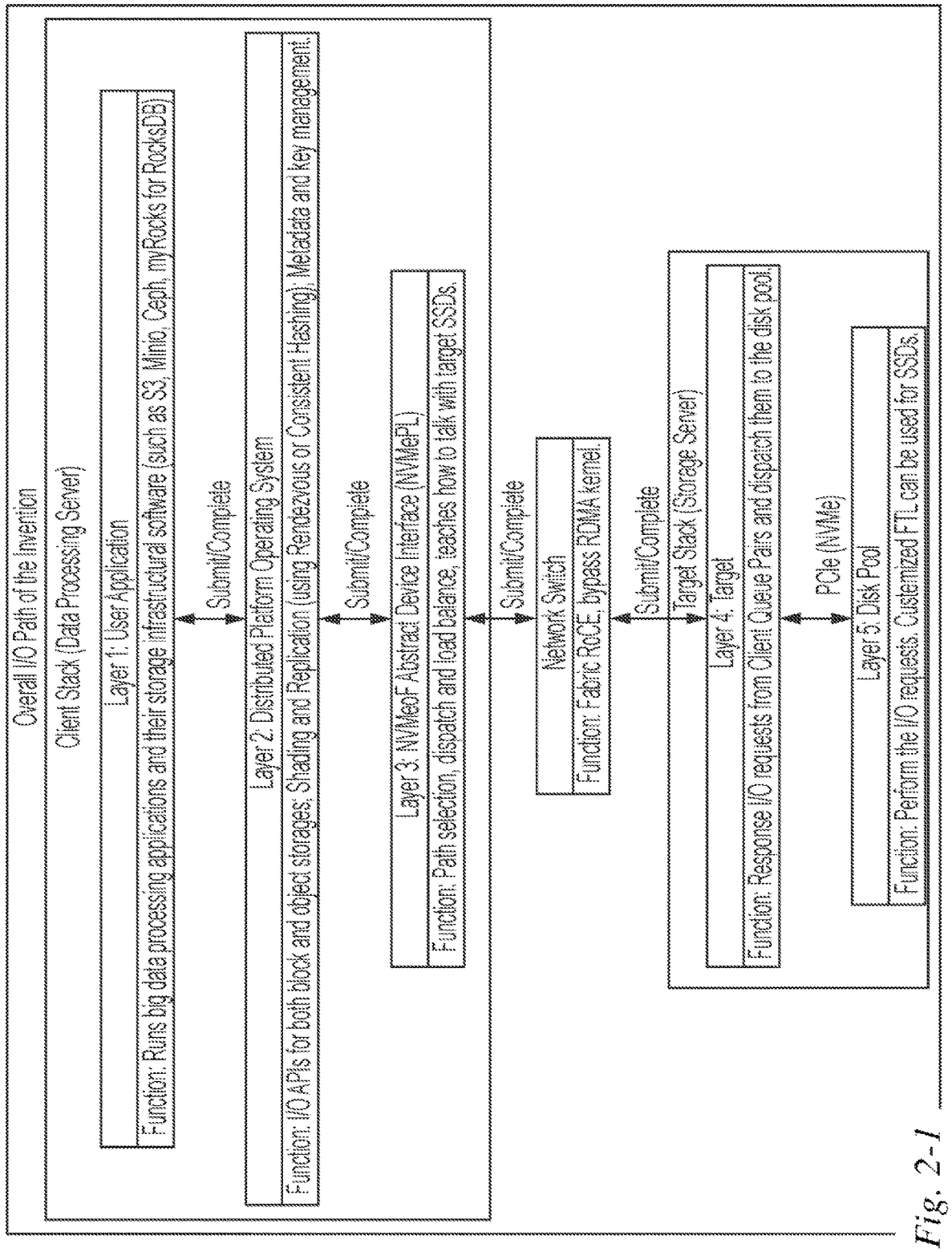
Figure 2:
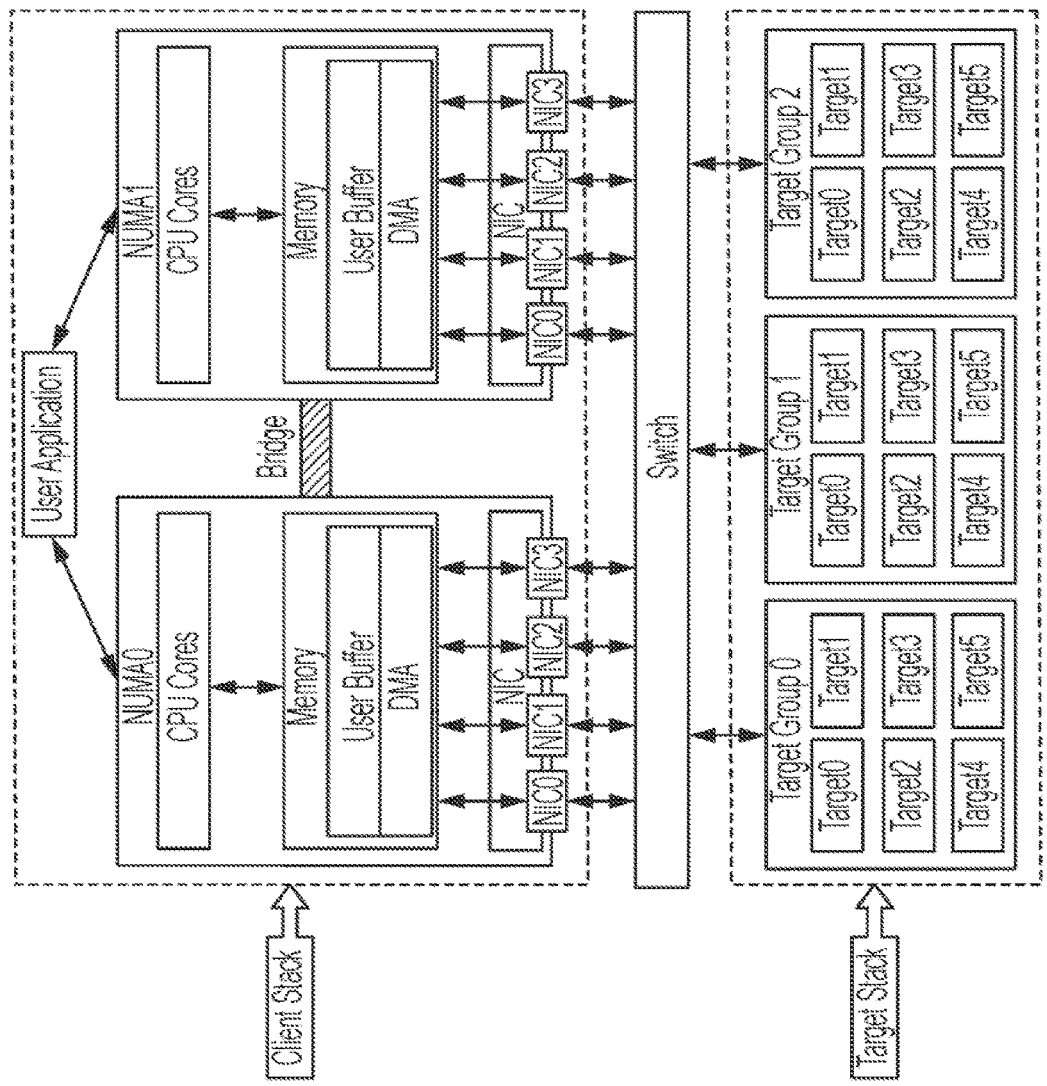

We first explain the entire I/O path of the NVMeoF architecture used in some embodiments. As shown in FIG. 2-1, we split the I/O path into two stacks: "Client Stack" also known as the data processing server, and "Target Stack" also known as the storage server. The system for path selection and load balancing subsystems and components as shown in FIG. 1-1 are inside the Layer 3 of FIG. 2-1.

The first layer in the first stack is "Layer 1: User Application", which stands for big data processing applications as well as their storage infrastructural software, such as Amazon S3, minio, Ceph, myRocks etc. Layer 1 generates I/O requests which will be forwarded to the next layer "Layer 2: Distributed Platform Operating System", which provides I/O operation APIs such as "put", "get", "delete" for both block-based storage and object-based storage (i.e., key-value storage), and also manages metadata and keys if key-value storage is used. In the real implementation, this layer is also designed for distributed systems to handle shading, replication (for recover or backup), even parallel fetching. We do not limit the shading, replication or parallel fetching schemes used in this layer, and both Rendezvous and Consistent hashing schemes may be used.

The "Layer 2: Distributed Platform Operating System" then decides corresponding NUMA candidates (i.e., based on the locations of the data's host and its replicas) to perform the distributed I/O operations. It forwards the I/O stream to the next layer "Layer 3: NVMeoF Abstract Device Interface" to talk with Target disks in the Target Stack server. An advantage of some embodiments (as shown in FIG. 1-1) relates to this layer, and our proposed two subsystems ("Subsystem 1: NUMA-Aware Path Selector" and "Component 2: NIC Load Balancer") and five supportive components ("Component 1: NUMA-NIC Path Selector", "Component 2: NIC Load Balancer", "Component 3: Queue Pairs Load Monitor", "Component 4: Workload Spike Detector", and "Component 5: Queue Pairs Load Balancer") are located in this the system for path selection and load balancing layer. The Distributed Platform Operating System may run in a processing circuit (discussed in further detail below) that may be referred to as a "centralized controller" or a "centralized processing circuit"; as such, the centralized controller may dispatch each input-output request to one of the input-output processors, to a NIC in a selected input-output processor, and to a queue pair (or "Queue Pair") in a NIC.

Layer 3 is the last layer in the Client Stack, and it connects to the "Target" through a "Network Switch" which is a multi-port network bridge that uses hardware addresses to process and forwards data networking device that connects devices together on a computer network.

In some embodiments, Fabric cables following RoCE (RDMA(Remote Direct Memory Access) over Converged Ethernet) protocol are used to connect the Client and Target stacks with the "Network Switch". In order to implement our customized schemes, the original RDMA kernel is bypassed.

The other side of the "Network Switch" is the "Target Stack" which is the storage server and consists of (e.g., includes) two layers—"Layer 4: Target" and "Layer 5: Disk Pool". Layer 4 responds to I/O requests from Client stack (more specifically, from Queue Pairs in NIC ports of NUMAs in the client stack), and dispatches them to the disks in Layer 5.

Finally, in Layer 5, all I/O requests are sent to their ultimate destination disk(s) through PCIe (NVMe) interfaces.

The "Layer 5: Disk Pool" layer may consist of both homogeneous or heterogeneous storage devices, mainly Flash-based SSDs, such as NVMe SSD, NVMe-based Key-Value SSD (i.e., KV SSDs), etc. If the Client Stack is using object-based storage, then the internal FTLs (Flash Translation Layer) inside SSDs in the "Layer 5: Disk Pool" may be further optimized to reduce the write amplification and wear leveling of devices, if possible.

2.2 Architecture and Workflow of NUMA Abstract Device Interface (the System for Path Selection and Load Balancing)

We next focus on an important advantage of some embodiments, the NVMeoF Abstract Device Interface (the system for path selection and load balancing) Layer. The Table of FIG. 2-1T summarizes the terminology used in this section.

An example of hardware and software model of the system for path selection and load balancing ("Layer 3: NVMeoF Abstract Device Interface" in FIG. 2-1) is shown in FIG. 2-2. Because some embodiments are mainly focusing on Layer 3 and its attached "Network Switch" as well as the Target Stack ("Layer 4: Target" and "Layer 5: Disk Pool"), we simplify the "Layer 1: User Application" and "Layer 2: Distributed Platform Operating System" into one single "User Application" box as shown in FIG. 2-2 (i.e., we use "User Application" to represent these two layers from now on).

During initialization, I/O streams are generated in Layer 1. The preferred storage destinations of each application are automatically assigned by Layer 2 with the consideration of shading, replication, and load balancing across servers. The result of such a destination plan (in "User Application" box of FIG. 2-2) is saved as a "Target Map", which has the NQN (NVMe Qualified Name) of the NVMeoF target subsystem (i.e., a list of Target (storage server) IDs), the namespaces (NS) that it supports, and the IP address and port tuples for all the multiple paths that exist to connect to that target.

Figures 2, 3:
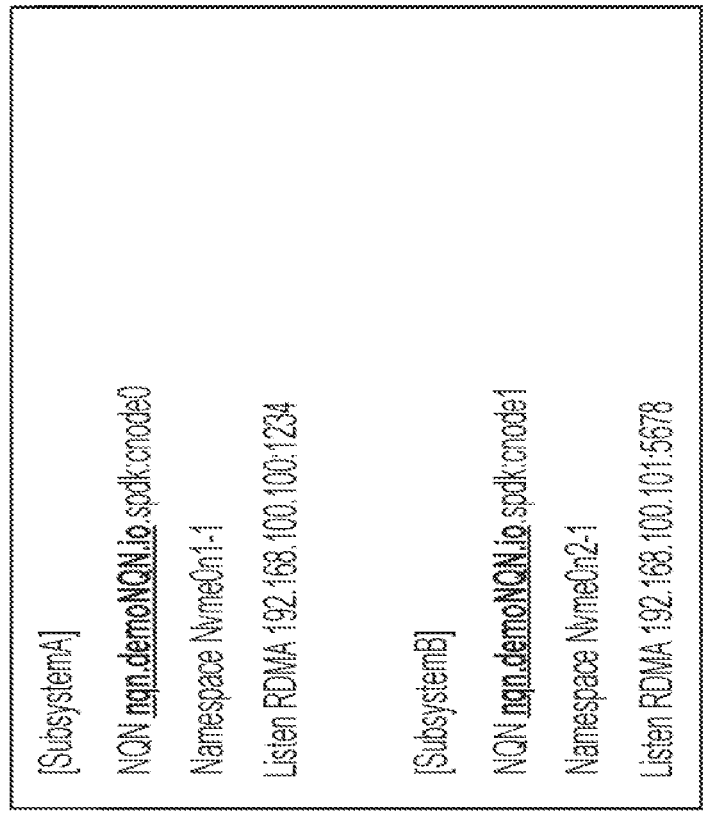

Namespace is the virtual volume (also can be called "partition") of storage devices, which can be either: (1) a partition of one single disk or the entire space of one single disk, or (2) a mixed group containing a number of disk partitions or entire space of disks. In the real implementation, this information can be stored in JSON or XML formats. For example, FIG. 2-3 illustrates the breadcrumb-style target configuration sample file, where the "User Application" has two targets in its target map.

In this case, the application has two preferred Targets (Storage servers), i.e., "SubsystemA" and "SubsystemB". "Subsystem" here is NVMeoF's naming method, and is not the subsystem 1 and 2 of some embodiments. The application also indicates two namespaces (i.e., virtual volumes "Nvme0n1-1" and "Nvme0n2-1") with the corresponding network I/O path as (IP=192.168.100.100, Port=1234), and (IP=192.168.100.101, Port=5678).

2.3 Overview of NUMA and NIC Dispatch Procedures

After the initialization phase, the host driver will identify the NUMA NICs that can be used to make a connection to each of these paths for the various targets in the "Target Map". Moreover, the host driver also identifies whether the underlying system supports NUMA (Non-Uniform Memory Access) or not. If the system supports NUMA, then the host driver needs to identify which NUMA socket the NICs are connected to and the IDs of the CPUs that are available in each of these NUMA sockets. Then each I/O request and its corresponding calculation operations are coupled and assigned to one single or more NUMA(s) (as described in Subsection 2.3.1) and the hoster driver will conduct all three-level dispatches (as described in the following Subsections 2.3.2 to 2.3.4). If the system does not support NUMA, then the host driver only conducts the second-level and third-level dispatching as described in Subsections 2.3.3 and 2.3.4.

2.3.1 Coupling I/O and Corresponding Calculation Operations with NUMA

As shown in FIG. 2-2, inside the Client stack of a system that supports NUMA, server hardware resources are grouped into two symmetric NUMAs, and each of them has multiple CPU cores sharing the same memory attached to them. Technically, NUMA is a method of configuring a cluster of microprocessors (i.e., CPU cores) in a multiprocessing system so that they can share memory locally, improving performance and the ability of the system to be expanded. NUMA adds an intermediate level of memory shared among a few microprocessors so that all data accesses do not have to travel on the main bus.

The memory inside each NUMA is further partitioned into two parts: "User Buffer" and "DMA (Direct Memory Access)". "User Buffer" is the place for the I/O returned results from the Target stack. "DMA" is dedicated for transmitting I/Os to and from the NVMeoF Targets, since the transport protocol RDMA requires pinning of memory regions for the purpose of obtaining contiguous physical memory for performing direct memory access. Specifically, DMA is achieved by pinning part of memory as "Hugepages" which can be allocated from all the memory associated with the same NUMA.

On the other hand, different NUMAs cannot share their "private" memory directly, instead, they have to conduct the costly "cross the NUMA bridge" (i.e., the main bus) operation. For example, as illustrated in FIG. 2-2, if NUMA0 (resp. NUMA1) needs to communicate with NUMA1 (resp. NUMA0) or to access the memory inside NUMA1 (resp. NUMA0), it has to go across the bridge. The usage of the bridge brings an overhead of main bus and NUMA cores, thus becomes a performance bottleneck (often known as the "performance penalty" of using the bridge).

To sum up, the advantage of using NUMA is that it is a tightly-coupled and share-everything symmetric multiprocessing system where multiple processors working under one single operating system access each other's memory over a common bus (i.e., interconnect path). As a result, the system for path selection and load balancing may assign each I/O request and its corresponding calculation operations as a "unibody" to the same NUMA to avoid conducting unnecessary cross-bridge operations, unless the performance gain of using the bridge and NUMA on the other side of the bridge is greater than the performance penalty of doing so. The table of FIG. 2-4T further shows the difference between three-level dispatches.

2.3.2 First-Level Dispatch: Between NUMAs

Besides coupling I/O requests and calculation operations with one single NUMA, the system for path selection and load balancing further needs to conduct a NUMA-level dispatch for load balancing and fully utilizing the resource, if NUMA is supported and there are more than one NUMAs in the system. As shown in FIG. 2-5, there are two NUMAs, each of them has three NICs, and each NIC also has three Queue Pairs. The data link of each NUMA is defined as "Path", as "Path0" and "Path1", and each path can have multiple subpaths via different NICs.

The "First-level Dispatch" is to find NUMA-NIC-Target paths and also balance I/O stream loads between two NUMAs.

An unbalanced situation will waste one NUMA and saturate the other NUMA, which eventually downgrades the overall performance.

Furthermore, the "First-level Dispatch" needs to consider different network connection scenarios (e.g., for some Targets, not both NUMAs are reachable), and also the capabilities of each NUMAs. Specifically, it needs to determine (1) whether to use one or both NUMA(s), and (2) how to set the ratio of I/O request assignment to two NUMAs.

For (1), the system for path selection and load balancing will first check the connection of each NUMA to the Target and decide to use one or two NUMA(s) based on a comprehensive gain-vs-penalty evaluation. In other words, an important contribution is that although the system for path selection and load balancing strives to avoid cross-bridge operations, the system for path selection and load balancing is still able to use the bridge for fully utilizing the idled NUMA that are not connecting to the Target to help complete the task parallelly if the penalty is less than the performance gain.

For (2), the system for path selection and load balancing will proportionally split the I/O stream to each NUMA based on their I/O processing capabilities and network bandwidths.

Details of how the system for path selection and load balancing conducts, in some embodiments, the "First-level Dispatch" are described in Subsection 3.2.

2.3.3 Second-Level Dispatch: Between NICs of Each NUMA

Each NUMA has multiple NICs (Network Interface Controller) which are network LAN ports (hardware resource) connecting to a "Network Switch" and eventually connecting to the "Target Stack". Once the NUMA-NIC level path selection is made, each NIC (which consists of (e.g., includes) multiple NIC ports) of each NUMA will receive assigned I/O requests, and the "Second-level Dispatch" is responsible for further balancing loads among NIC ports in the NIC of each NUMA. Although "First-level Dispatch" determines the ratio of the I/O request stream to assign to each NUMA, it does not specify how to dispatch these I/Os among multiple NIC ports of that NUMA.

Functions of the "Second-level Dispatch" are achieved by the "Component 2: Queue Pair Load Balancing Dispatcher" as described in Subsection 3.3.

2.3.4 Third-Level Dispatch: Between Queue Pairs of Each NIC

Inside each NIC port, there are multiple Queue Pairs (QPs), and each Queue Pair has one "Submit Queue" and one "Complete Queue". To simplify the problem formulation, we use one "Queue Pair" to represent both "Submit Queue" and one "Complete Queue" in the remainder of the disclosure, since during the dispatching algorithm designs, there is no need to break the "Queue Pair Unibody" and modify their internal structures. Once a NUMA path is selected, the system for path selection and load balancing needs to conduct load balancing across Queue Pairs of each NIC port inside the NUMA. The system for path selection and load balancing is aiming to optimize the performance without modifying the NIC hardware configurations, which means that it will not change the number of NIC ports, but only balance loads across Queue Pairs inside each NIC. Functions of the "Third-level Dispatch" are achieved by the "Subsystem 2: Queue Pair Load Balancing Dispatcher" as described in Section 4.

3. Subsystem 1: NUMA-Aware Path Selector

In this section, we first formulate the problem of NUMA path selection and both first-level (i.e., from UA_CQ to NUMA_CQs) and second-level (i.e., from NUMA_CQ to NIC_CQs) load balancing, as shown in Subsection 3.1. Based on our bottleneck-based service rate analysis, we further present the algorithms used in Components 1 and 2 in Subsection 3.2 and 3.3, respectively.

3.1 Problem Formulation

We first clarify the four challenges and corresponding design goals for the "Subsystem 1: NUMA-Aware Path Selector", as shown in the table of FIG. 3-1T. Motivated by these design goals, the system for path selection and load balancing's NUMA-aware path selection may aim to:

(1) Assign each I/O request and its corresponding calculation operations as a "unibody" to the same NUMA to avoid conducting unnecessary cross-bridge operations;
(2) Balance the loads between two NUMAs with the consideration of NUMA capability (e.g., NUMA service rate, NIC bandwidth, etc);
(3) Strive to fully utilize the system resources by assigning the idled target-unreachable NUMA to finish the I/O task, and using the bridge to forward the results through target-reachable NUMA's NIC to the Target, if the performance penalty is less than performance gain;
(4) After the NUMA NIC level path selection is made, further to balance I/O loads across NICs in the each NUMA based on each NIC port's connection configuration (i.e., target reachable or not, since NIC ports in each NUMA can connect to different targets) and bandwidth to targets.

The table of FIG. 3-2T further describes the functions of each component in subsystem 1.

In the following Subsections, we formulate the problem and modeling the NUMA selection workflow based on a bottleneck-based analysis.

3.1.1 Server Queueing Model for NUMA Systems

As illustrated in FIG. 3-3, the dual-NUMA system can be modeled into a multiple-paths queueing model.

The "User Application" (i.e., as we mentioned in Section 2, "User Application" represents the unibody of "Layer 1: User Application" and "Layer 2: Distributed Platform Operating System") generates I/O streams with the arrival rate A this is queued in a User Application Centralized Queue in (UA_CQ).

This arrival stream is further divided into two substreams $\lambda_N$ and $\lambda_{\bar{N}}$ to NUMA path NUMA0, and NUMA1, respectively.

3.1.1.1 Servers Along the Path

Furthermore, the NUMA system has three types of "servers" (the "server" concept used here is from the queueing model of view, and is not referring to any actual datacenter server machines):

(1) NUMA Server: as shown in the top two boxes 310 in two NUMAs in FIG. 3-1, we model the "CPU Cores" and "Memory" as one single unit, and use the entire service rate of it as NUMA server's service rate $\lambda_N$.
(2) NIC Server: as shown in the bottom two boxes 320 in two NUMAs in FIG. 3-1, we sum up all NIC ports' throughput as the NIC service rate $$\sum_{n \in \Psi(N)} \mu_{N \to n \to T}.$$

In other words, it represents the service rate of the entire I/O path, which includes all subpaths from NUMA N via its NIC ports ("n"s) to Target T.

(3) Bridge Server: as shown in the box in the middle of FIG. 3-1 (right downward pattern), cross-bridge service rate measures the bandwidth of the bridge $\mu_B$. Usually, a bridge connects two NUMAs, so we use N and N bar to indicate these two NUMAs.

3.1.1.2 Paths and Bottlenecks

The three types of servers are along all four possible I/O paths as shown in FIG. 3-2. To better explain our modeling method, we list the symbols and descriptions in the table of FIGS. 3-3AT and 3-3BT. In detail, paths 1 and 3 are the cases that the Target is directly reachable from the assigned NUMA, thus the bridge is not used. Paths 2 and 4 are the cases that the Target is not reachable from the assigned NUMA but is reachable from the other NUMA, thus the bridge is used to forward the computed results to the Target indirectly.

The overall actual service rate of each path may be bottlenecked by the server who has the lowest service rate in that path. For example, if the "NUMA service rate" is less than the "NIC service rate" in path 1, then path 1's service rate is bottlenecked by (i.e., equals to) the "NUMA service rate". Similarly, if the bridge is used (e.g., path 2), then the entire service rate of path 2 should be the lowest value of "NUMA service rate", "NIC service rate" and "Bridge service rate".

3.1.2 Bottleneck-Based Service Rate Analysis 3.1.2.1 Not Using Bridge

For paths 1 and 3, there are only two "servers" along the path (i.e., "NUMA server" and "NIC server"), so we can use the bottleneck of the two servers to calculate the overall service rate of each NUMA (without using bridge) as:

$$\begin{cases} \mu_{N \to T} = \min\left(\mu_N, \sum_{n \in \Psi(N)} (\mu_{N \to n \to T})\right) \\ \mu_{\bar{N} \to T} = \min\left(\mu_{\bar{N}}, \sum_{n \in \Psi(\bar{N})} (\mu_{\bar{N} \to n \to T})\right) \end{cases} \quad \text{Eq. 3-1}$$

3.1.2.2 Using Bridge

For paths 2 and 4, there are three "servers" along the path (i.e., "NUMA server", "NIC server" and "Bridge server"). We denote the target-unreachable NUMA as "Out" and the target-reachable NUMA as "In" (as used herein, "Out" means "outbound", and "In" means "inbound"). Moreover, since the NIC resource on the "In" NUMA is shared by both "In" and "Out" NUMAs when the bridge is used, we use a usage factor ρ to represent the NIC resource ratio that this "Out" path is using. Thus, we can calculate the overall service rate of the "Out" NUMA (using the bridge) as:

$$\mu_{Out \to B \to T} = \min\left(\mu_{Out}, \mu_B, \rho \cdot \sum_{n \in \Psi(In)} (\mu_{In \to n \to T})\right) \qquad \text{Eq. 3-2}$$

In fact, ρ also directly determines how to dispatch the λ to each NUMA. Moreover, it may be advantageous to find a sweet spot of ρ, so that the entire performance of both NUMAs (sum of the service rates of Out→B→T and In→T paths) is maximized. Details of them are described in Section 3.2. Eq. 3-2 is calculating the Out→B→T path, for the calculation of In→T path, we do need to consider the penalty brought by using the bridge. Details of the In→B→T path service rate calculation are described in Subsection 3.2.3.1.

3.2 Component 1: NUMA-NIC Path Selector

Based on the bottleneck-based queueing model presented in Subsection 3.1, we develop a NUMA-aware Path Selection Algorithm implemented in Component 1. FIG. 3-3 shows the main procedure of Component 1. FIGS. 3-4A and 3-4B, together referred to as FIG. 3-4 further illustrate the algorithm of Subsystem 1. In detail, after creating instances of Components 1 and 2 in line 2 in FIG. 3-4, Subsystem gets the I/O stream and sends it Component 1 (line 4 and 5) for dispatching across NUMA-NIC paths. In line 7 and 8, Component 1 calculates the service rates of two NUMA paths to the target without using the bridge. Based on the results of these service rates, we can divide the problem into three cases, as described in the following subsections.

3.2.1 Case 1: No NUMAs Connect to Target

Figures 2, 3, 4:
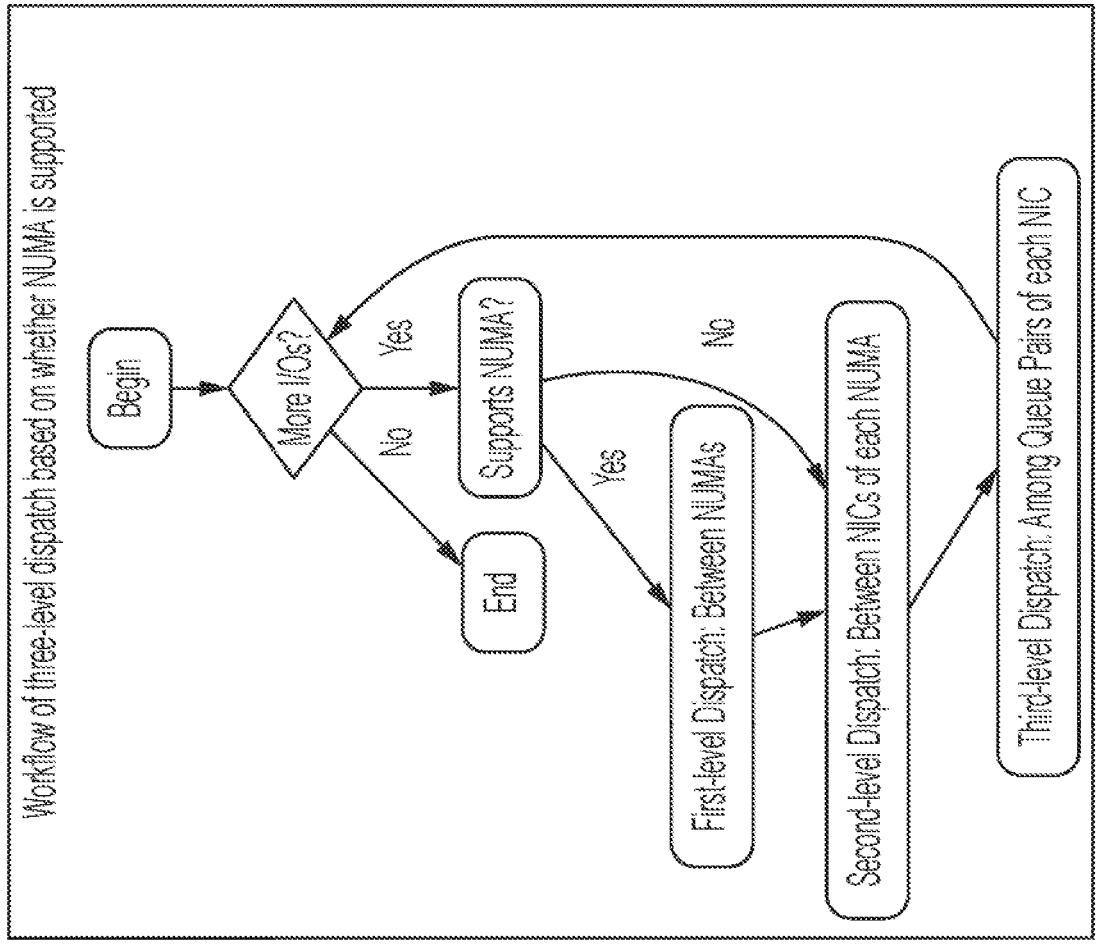

If no NUMAs are reachable to the target, then it will simply return an error message "Targets are not reachable.", as shown in lines 9-10 in FIG. 3-4.

An example and a corresponding queueing model of Case 1 are shown in FIGS. 3-5 and 3-6, where neither of two NUMAs can reach any disks in Target Group 2.

3.2.2 Case 2: Both NUMAs Connect to Target

If there are multiple NUMA sockets available and both of the NUMAs can connect to the preferred Target via their own NICs, then the system for path selection and load balancing does not use the bridge (i.e., avoid letting NUMAs access each other's memory and triggering any interference and performance downgrade).

An example is shown in FIG. 3-7 where two NUMAs can reach all targets, and FIG. 3-8 also illustrates a queueing model for this case. Moreover, to balance the load, a straightforward approach is to use robin fashion using a tool like "numactl" or a system-wide setting. However, if these two NUMA paths have different service rates, then we can balance the load based on each NUMA's capability (defined as "NUMA Path Service Rate").

Based on this, we can dispatch the incoming I/O stream with the following ratios to NUMA N and N̄, according to:

$$\begin{cases} \lambda_N = \dfrac{\mu_{N \to T}}{\mu_{N \to T} + \mu_{\bar{N} \to T}} \cdot \lambda \\ \lambda_{\bar{N}} = \dfrac{\mu_{\bar{N} \to T}}{\mu_{N \to T} + \mu_{\bar{N} \to T}} \cdot \lambda \end{cases} \qquad \text{Eq. 3-3}$$

This is achieved by the dispatch function in lines 11-13 of FIG. 3-4. In detail, the dispatch function of Component 2 takes five inputs (implemented in lines 32 to 41) as shown in Table 3-4. When Eq. 3-3 is used, a plurality of input-output requests may be dispatched, each to either NUMA N (a first input-output processor) or NUMA N̄ (a second input-output processor), the dispatching being in proportion to the service rate of the first input-output processor to the target (e.g., a first target) and a service rate of the second input-output processor to the first target, respectively.

The dispatch function lets the "User Application" get its user buffers (for the assigned I/O requests based on Eq. 3-3) allocated from the Heap memory in the corresponding NUMA sockets. By doing this, the system for path selection and load balancing can utilize all the resources in the system more efficiently.

3.3 Case 3: One NUMA Connects to Target

If only one NUMA can reach the target, then we have two choices:

(1) Use both NUMAs and use the bridge to transfer data from the target-unreachable NUMA to the target-reachable NUMA's NIC. The benefit of doing so is that it can fully utilize all NUMA cores, and the concern of doing so is that it may slow down the target-reachable NUMA's core service rate;

(2) Only use the target-reachable NUMA to process all I/Os.

3.2.3.1 Decision Making of Whether to Use Bridge

The system for path selection and load balancing first evaluates the solution based on the overall service rate of the entire NUMA system under two choices (i.e., use and not use the bridge). The system for path selection and load balancing then selects the solution that brings better overall service rate of the entire NUMA system. The system for path selection and load balancing only uses the bridge when one path is reachable and the other is not reachable (i.e., Case 3), and the system for path selection and load balancing does not use the bridge when both paths are reachable (i.e., Case 2).

FIG. 3-9 shows an example of Case 3 where only one NUMA can reach targets in Target Group 2.

The evaluation of "use the bridge" and "not use the bridge" is described as follows:

First the system for path selection and load balancing identifies which NUMA can reach the Target and which cannot and marks them as "In" and "Out" respectively, as shown in line 14 of FIG. 3-4. Then, the system for path selection and load balancing calculates the overall service rate of the entire NUMA system if we do not use the bridge. The total service rate is simply the target-reachable path's service rate, which may be calculated as:

$$\mu_{\Sigma NB} = \min\left(\mu_N, \sum_{n \in \Psi(N)} (\mu_{N \to n \to T})\right) \qquad \text{Eq. 3-3}$$

This can be seen from lines 16 and 25-26 of FIG. 3-4.

The system for path selection and load balancing then calculates the overall service rate of the entire NUMA system if we use the bridge (shown in lines 16 and 27-31 of FIG. 3-4), which contains two paths: target-unreachable NUMA path (i.e., the left one in FIG. 3-9) and target-reachable NUMA path (i.e., the right one in FIG. 3-9). The first path (i.e., Out→B→T) can be calculated by using Eq.3-2, and we temporarily leave p alone as we will discuss it later. For the second path (i.e., In→T),), we need to calculate the penalty factor E which reflects the downgrade degree of the target-reachable NUMA when the bridge is used by calling "calPenalty" function (line 29 of FIG. 3-4), which may be written as:

$$\varepsilon = \text{calPenalty}(\mu_{Out \to B \to T}, \mu_{In}, \mu_B) \quad \text{Eq. 3-4}$$

This calPenalty( ) can be regressed during runtime. To further reduce the overhead, this regression can be conducted periodically with a preset time window. The table of FIG. 3-5T shows the detailed inputs of this function.

Once we have the penalty factor, we can finally calculate the right path's service rate as:

$$\min\left(\mu_{In} - \varepsilon, (1-\rho) \cdot \sum_{n \in \Psi(In)} (\mu_{In \to n \to T})\right) \quad \text{Eq. 3-5}$$

In Eq. 3-5, $\rho$ is the fraction of I/Os dispatched to the target-unreachable NUMA. In other words, it is the percentage of the service rate of the target-reachable NUMA's NIC resource that is used by the target-unreachable NUMA. If the bridge is not used, then $\rho=0$.

It may be seen that it is bottlenecked by two servers: the NUMA core service rate of NUMA "In", and the remaining available NIC service rate of NUMA "In". Thus, the overall system service rate of using the bridge may be calculated as:

$$\mu_{\Sigma B} = \mu_{Out \to B \to T} + \min\left(\mu_{In} - \varepsilon, (1-\rho) \cdot \sum_{n \in \Psi(In)} (\mu_{In \to n \to T})\right) \quad \text{Eq. 3-6}$$

We can use the gradient descent method to find a sweet spot of $\rho$ to maximize $\mu_{\Sigma B}$, as:

$$\rho = \underset{\rho \in [0,1]}{\operatorname{argmax}}(\mu_{\Sigma B}) \quad \text{Eq. 3-7}$$

We do not limit the form of the penalty function, nor the method to find the sweet spot in this embodiment. For example, the penalty function may be a linear function of its variables, or a polynomial function of its variables. Lastly, the system for path selection and load balancing compares values of Eq. 3-3 and Eq. 3-5, and picks the solution that has a larger value as the current decision. Once a decision is made, we dispatch based on $\rho$, as shown in lines 18-24 of FIG. 3-4. The results will be sent to Component 2 as shown in lines 32 to 40 of FIG. 3-4.

3.3.3.1 Case 3(a): Use Both NUMAs

As shown in line 16 to 18, if the performance gain of using the target-unreachable NUMA via the bridge is greater than not using it, the system for path selection and load balancing will use both paths with the help of the bridge.

3.3.3.2 Case 3(b): Use One NUMA

As shown in lines 13 to 15, if the overall service rate of the entire NUMA systems of using the bridge is actually less than not using the bridge, the system for path selection and load balancing will not use the bridge and simply send all I/O streams to the target-reachable NUMA. As shown in FIG. 3-11, in this example, the left path is abandoned and only the right path is utilized.

3.3 Component 2: NIC Load Balancer

While Component 1 determines the ratio of the I/O request stream to assign to each NUMA (i.e., from UA_CQ to NUMA_CQs), it does not specify how to further dispatch I/Os among multiple NIC ports of that NUMA (i.e., from NUMA_CQ to NIC_CQs). The reason is that during the path selection procedure, for calculation efficiency, Component 1 sums up all NIC port resources of each NUMA as one single "NIC resource unibody", as shown in Subsection 3.1.1.1.

However, the system for path selection and load balancing still needs to balance loads across NIC ports (which are able to reach the preferred target) of each NUMA to avoid the case that some of them are idle while others are saturating which causes resource underutilized. In fact, the system for path selection and load balancing will conduct more comprehensive load balancing inside each NIC port in Component 3, 4 and 5 (will be described in Section 4).

To avoid doing comprehensive load balancing twice, a round robin technique may be used, since it has almost negligible overhead which is important for improving I/O traffic speeds. Assume we have m numbers of NIC ports in NUMA N (NIC ID is from 0 to m−1), and we keep the previous used Queue Pair ID p. Then round robin is implemented by adding one to the p for each new I/O request. If the result exceeds the boundary, then the value of p goes back to zero, as:

$$\begin{cases} p+1, & p \in [0, m-2] \\ 0, & p = m-1 \end{cases} \quad \text{Eq. 3-8}$$

This can also be seen from lines 33 to 40. Indeed, if the system is sufficiently powerful (i.e., has a lot of idled CPU and memory resources), one can also conduct more comprehensive load balancing in this level by using a similar technique we will introduce in Section 4, which will consider NIC-target connection, queue workload status, and NIC-target bandwidth.

4. Subsystem 2: Queue Pair Load Balancing Dispatcher

The second-level dispatch procedure is mainly focusing on balancing the I/O loads among Queue Pairs in each NIC port of the NUMA-NIC path assigned by Subsystem 1. In some embodiments, the system for path selection and load balancing does not modify hardware-level NIC port connection, but strives to optimize the performance by balancing loads in Queue Pairs of each NIC port.

In this section, we first formulate the problem by using a queueing model. We then present the overall workflow and algorithm used in Subsystem 2. Followed by that, we present the three components implemented in Subsystem 2. To better understand the system, we summarize the major functions of these components in the Table of FIG. 4-1T.

4.1 Problem Formulation

Once Subsystem 1 determines the selection of the NUMA-NIC path, it will assign I/O requests to those selected NUMA NIC ports. For each selected NIC port, these assigned I/O requests will be queued into a Centralized Queue of the NIC port (i.e., NIC_CQ). Subsystem 2 is implemented inside of each NIC port, and it strives to balance the load across Queue Pairs in that NIC port.

In this subsection, we first propose a queueing model of Queue Pairs in each NIC port, and then present the data structure of I/O requests and characteristics of I/Os. Lastly, we introduce a main workflow and algorithm that may be used in the Subsystem 2.

4.1.1. Queueing Model of Queue Pairs

FIG. 4-1 shows an example of I/O dispatching inside each NIC port (i.e., NUMA-NIC path) and the relationship between queue model and I/O stacks. Here we zoom into NIC3 in NUMA1, which connects to Target1 in Target Group2. Each NIC port has its own Centralized Queue (i.e., NIC_CQ, not UA_CQ and NUMA_CQ), and all I/Os that are assigned to this NIC port will first be queued in this NIC_CQ. The dispatcher then distributes those queued I/Os one by one to attached Queue Pairs (QPs). Each queue pair is connected to the corresponding Queue Pair in the "Layer 4: Target".

The connection configuration of Queue Pairs in each NIC is homogenous (i.e., all of them can access the connected Target of the host NIC port), but we cannot easily guarantee that Queue Pairs' service rates are always the same during runtime.

The design goal of the dispatcher is to balance loads across all Queue Pairs in the selected NUMA-NIA path's NIC port (in Client Stack, not the Target Stack, since the system for path selection and load balancing is not aimed to modify anything in the Target Stack). It is worth mentioning that balancing loads of Queue Pairs in the NIC port will eventually help to balance loads in corresponding Queue Pairs in the Target NICs indirectly.

Next, we need to specify what the objects we need to conduct load balance on are. In some embodiments, we balance I/O requests queued in the Centralized Queue in NIC (NIC_CQ). In a simplified homogeneous scenario, if these I/O requests have the same amount of workload (i.e., spends the same makespan), then we can simply balance the QPs based on the number of queued I/Os. However, I/Os are not homogeneous, and in fact, I/Os from applications or from even one single application may have significant differences in real cases.

In the next subsection, we introduce the data structure of I/O requests in some embodiments.

4.1.2 Data Structure of I/O Request

In some embodiments of the system for path selection and load balancing on NVMeOF, each I/O request can be encapsulated into an instanced struct which contains a key and a value object, as:

IO_pkt_struct: [key_ptr, value_struct]

The value_struct is defined as:

value_struct: [value_ptr, value_size, length, offset, operation]

The table of FIG. 4-2T describes details of each parameter. FIG. 4-2 further illustrates the topology of them.

Based on our observation, the dominative factor among these parameters that impact performance (latency) the most are "length" (i.e., the I/O size) and "operation" (i.e., read, write, delete, etc).

The reason behind this is straightforward—if I/O request #1 is a 4 KB read and I/O request #2 is a 10 MB write, the dispatcher should not treat them equally since they will end up with different makespan (i.e., I/O finish time).

Thus the system for path selection and load balancing needs to differentiate the I/Os based on their characteristics by converting them based on their (estimated) actual workload (makespan). Details of this conversion will be described in Subsection 4.2.

4.1.3 Overall Workflow Between Components

We show the workflow chart and algorithm code of the Subsystem 2 in (i) FIG. 4-3 and (ii) FIGS. 4-4A and 4-4B (together referred to as FIG. 4-4), respectively. Once the NIC port receives the assigned I/O request from Subsystem 1, it queues them in the NIC_CQ. Then Subsystem 2 asks Component 3 whether this NIC has only one Queue Pair or not (line 7 of FIG. 4-4). If yes, then it sends all I/Os to this only Queue Pair, since there is no need to balance loads at all in this case. If no, then it further checks whether the current time reaches a new strategy update window (as shown in line 10 of FIG. 4-4). The table of FIG. 4-3T shows the details of two epoch windows and their functions used in Subsystem 2.

If yes, the system for path selection and load balancing may call Component 4 to detect Spike Degree of current I/O traffics in the NIC_CQ. Once it is the time to recalibrate strategy, "Component 4: Workload Spike Detector" is called to calculate the Centralized Queue I/O spike degree. Else, it keeps the same load balancing strategy of the current epoch.

In other words, once a load balancing strategy is determined, Subsystem 2 will lock to that strategy and "Component 3: Queue Pairs Load Monitor" will be used (if necessary) to help the current strategy to dispatch. This lazy "strategy updating" frequency is designed to reduce the updating cost.

The spike degree result may be sent to "Component 5: Queue Pairs Load Balancer" which switches between three strategies (lines 10 to 18 of FIG. 4-4 and lines 19 to 37 of FIG. 4-4). Details of them will be provided in the following subsections.

As discussed in Subsection 4.1.2, only considering the number of I/Os is not enough, so the system for path selection and load balancing needs to differentiate the I/Os based on their characteristics by converting them based on their (estimated) actual workload (makespan). The system for path selection and load balancing estimates the actual workload amount of a single I/O (denoted as "$\mu_{<v_i,q>}$") by dividing the size of the I/O request by the service rate of the Queue Pair q for the I/O request's operation type, as:

$$\tau_{<i,q>} = \frac{S_i}{\mu_{<v_i,q>}} \qquad \text{Eq. 4-1}$$

For example, if a write I/O has 1024 kB size, and the write rate of that Queue Pair is 1024 MB/sec, then the actual workload amount is around 0.001 sec. In other words, in order to calculate Eq. 4-1, the system for path selection and load balancing needs to pull information of the new I/O's size and type, and each Queue Pair's service rate for this new I/O's type.

Although usually all Queue Pairs in the same NIC port appear to have the same service rate for the same type of operation, Eq. 4-1 also supports the rare case that Queue Pairs in the same NIC port have heterogeneous service rates for the same type of operation (i.e., reflected by $\mu_{<v_i,q>}$).

Based on Eq. 4-1, the system for path selection and load balancing can further calculate the total actual workload amount of all queued I/O requests in Queue Pair q (denoted as "$l_q$") by summing up all actual workload amount of I/O requests in Queue Pair q, as:

$$\ell_q = \sum_{i \in \{q\}} \tau_{<i,q>} = \sum_{i \in \{q\}} \left( \frac{S_i}{\mu_{<v_i,q>}} \right) \qquad \text{Eq. 4-2}$$

It may be costly to gather and calculate these queue workload status very frequently, so the system for path selection and load balancing has an epoch window (queueStatusUpdateWindow) to periodically "recalibrate" queue status. Doing this can reduce the overhead, but also introduce an information delay which may lead to suboptimal dispatching solutions.

For example, in a high traffic time (i.e., high I/O spike time), this delay may lead to assigning all I/Os to a Queue Pair that was the idlest one in the last epoch, while other Queue Pairs are idle because they have finished their queued I/Os. This imbalance not only wastes system resource but also causes backlogs. Thus, we further need to detect spike degree (Subsection 4.3) and apply different load balancing strategies for different spike degree scenarios (Subsection 4.4).

4.3 Component 4: Workload Spike Detector

In order to let the system for path selection and load balancing qualitatively capture I/O request spikes in a single score (i.e., a degree value) and also be able to predict (or identify) the start and the end of a spike period, we present a "SCV-autocorrelation" based spike detection method implemented in Component 4. In detail, the degree of spikes can be mathematically defined as an index r; of dispersion of a stochastic process, as:

$$\eta = SCV\left(1 + \alpha \cdot \sum_{\theta \in [1, \theta_{max}]} \left(\frac{E\left[(|c|_{t+\theta} - \overline{|c|_{t+\theta}}) \cdot (|c|_t - \overline{|c|_t})\right]}{\sigma^2}\right)\right) \quad \text{Eq. 4-3}$$

The spike degree is the squared-coefficient of variation (SCV) of an autocorrelation-based function. The joint presence of SCV and autocorrelations is sufficient to differentiate I/O workloads with different spikes intensities. $\alpha$ is a preset knob that can adjust the weight of ACF (e.g., $\alpha$ can be 1, 2, 3, 4, etc). $\theta$ is a lag between t and t+$\theta$, and $\delta$ is the variance of the NIC Centralized Queue (NIC_CQ) queued I/O number.

We assume that the arrival distribution follows a wide-sense stationary process which means it is a time-independent process. As a result, the autocorrelation depends only on the lag $\theta$ since the correlation depends only on the time-distance between the pair of values but not on their position in time.

Figures 2, 3, 4, 5:
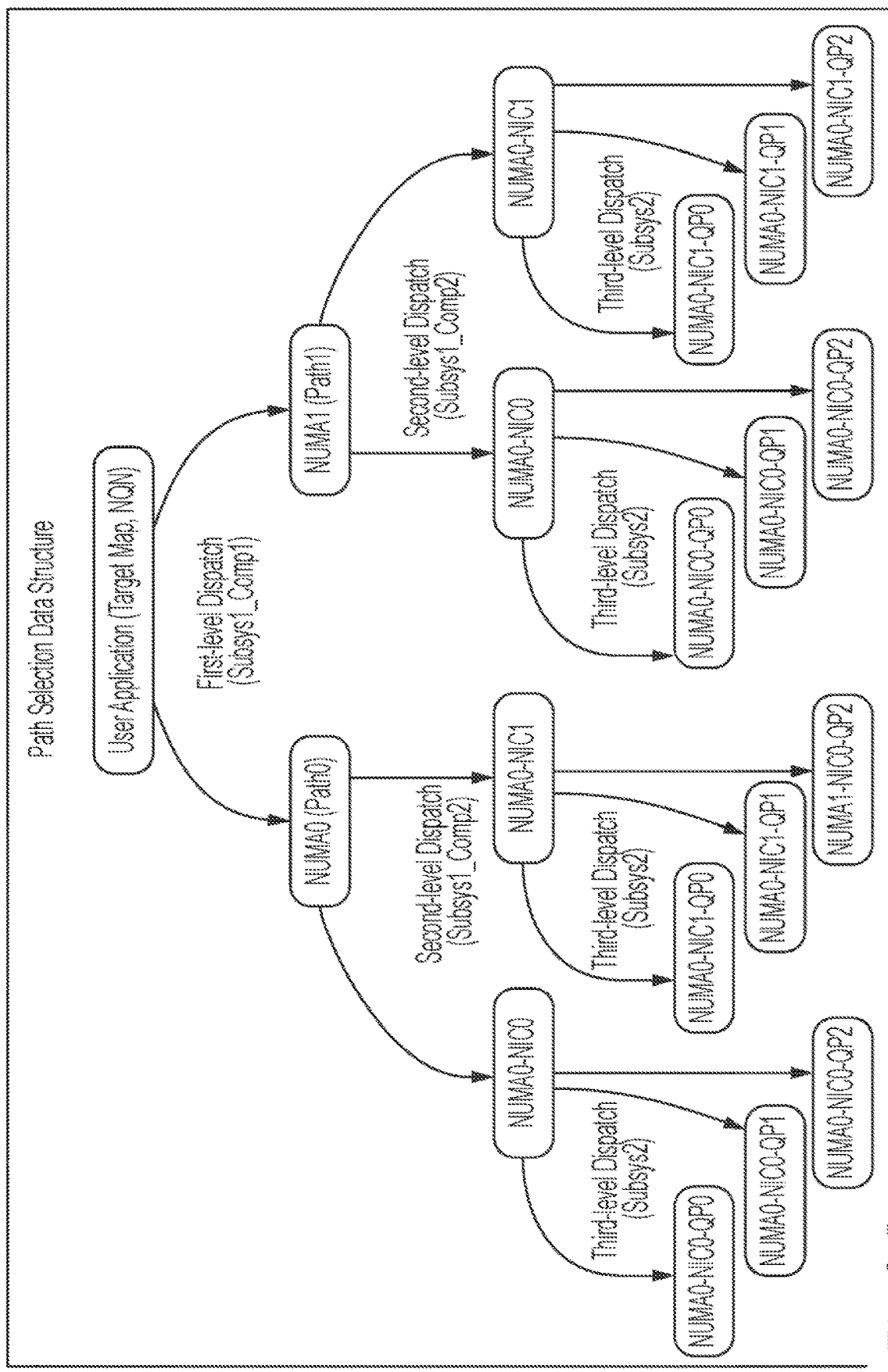
Figures 1, 3:
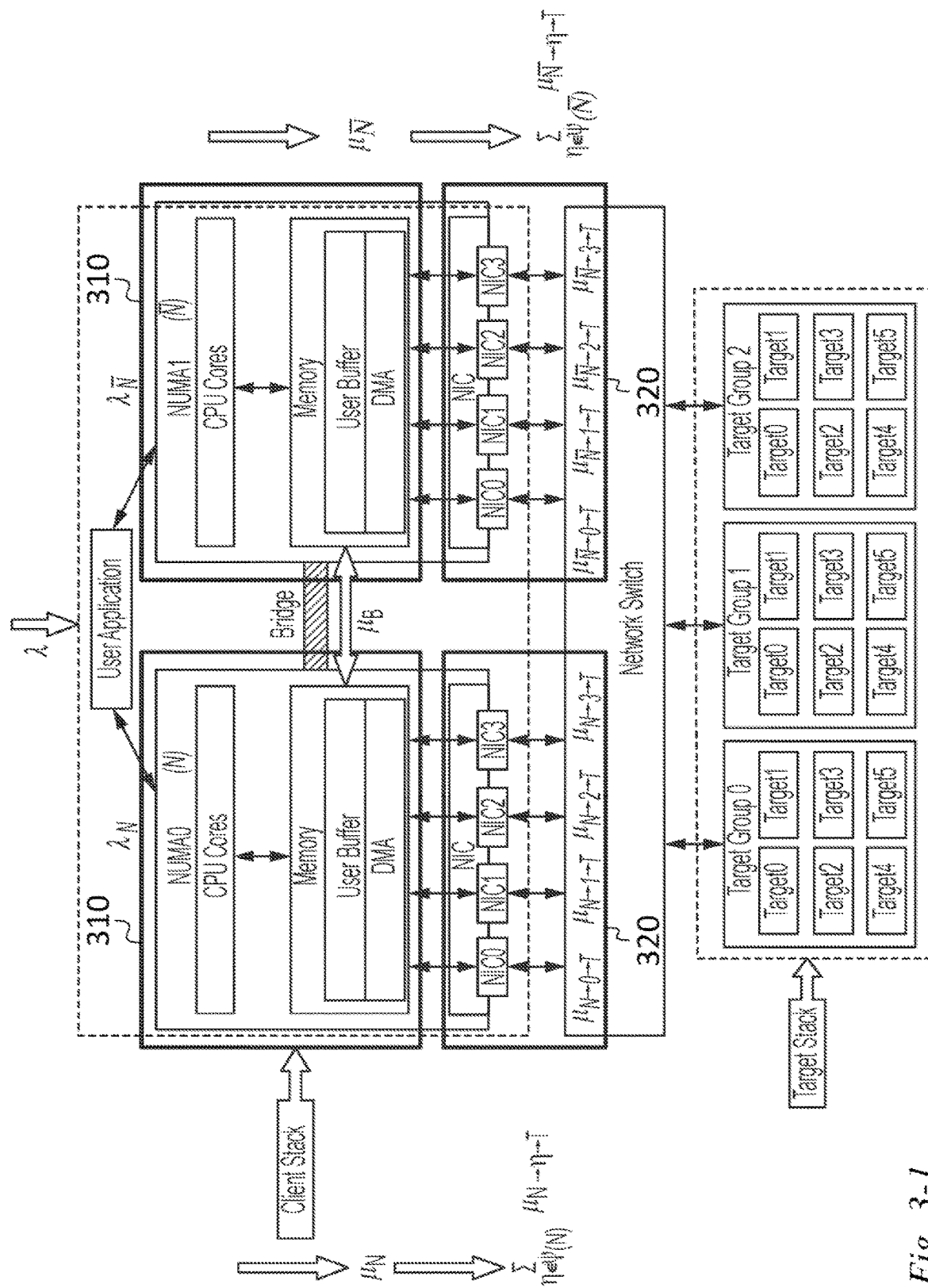
Figures 2, 3:
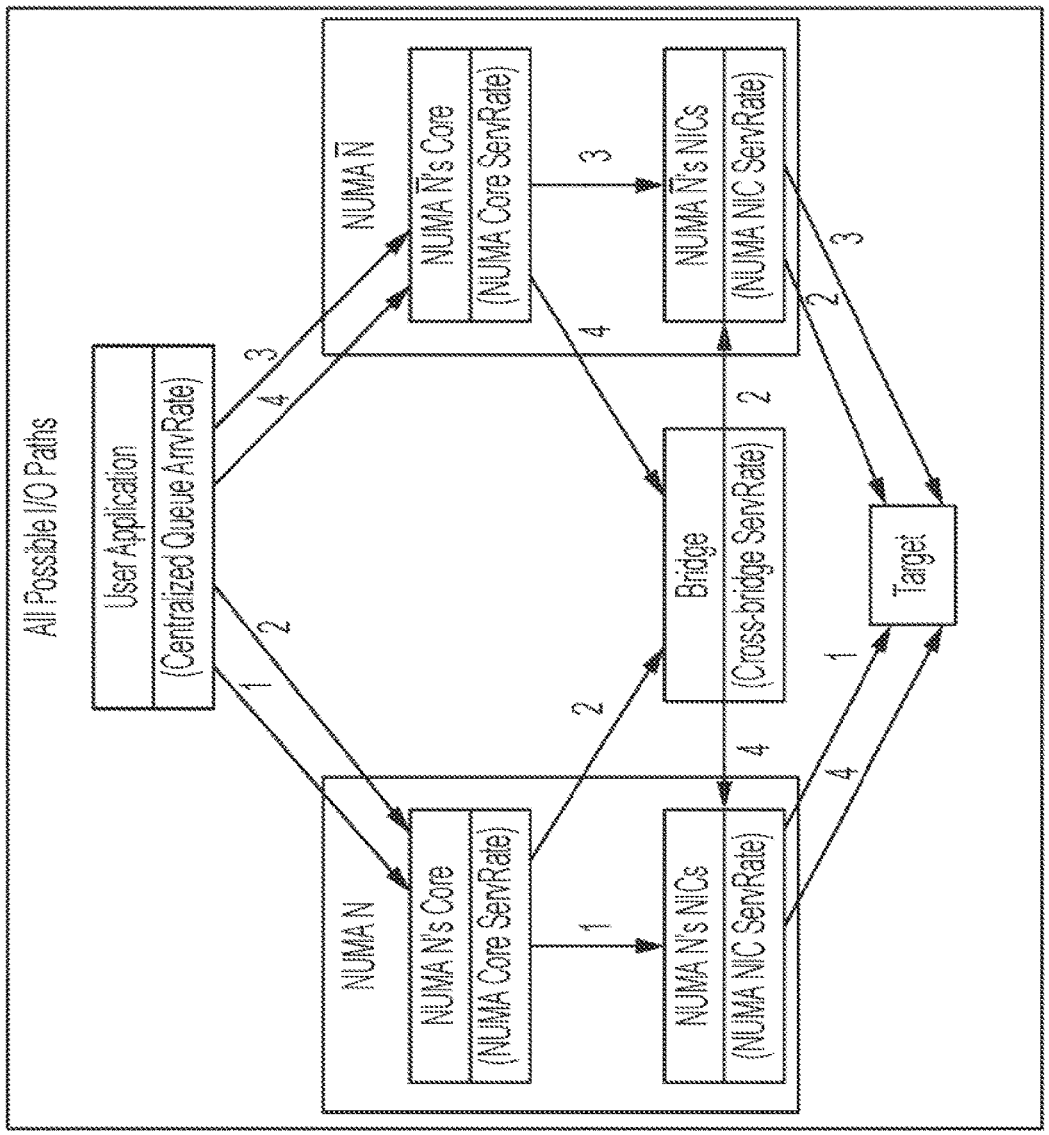
Figure 3:
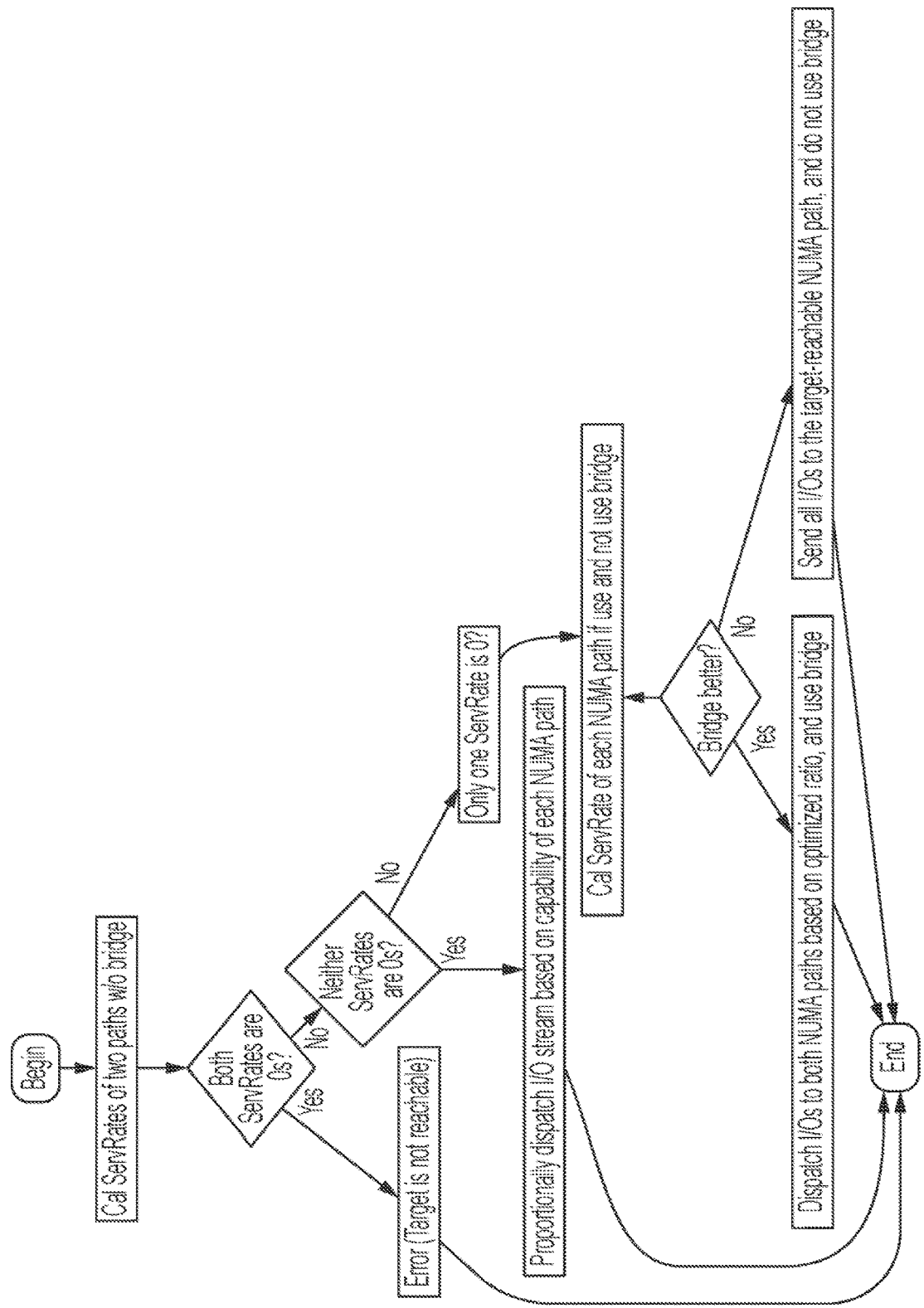
Figures 3, 4, 5:
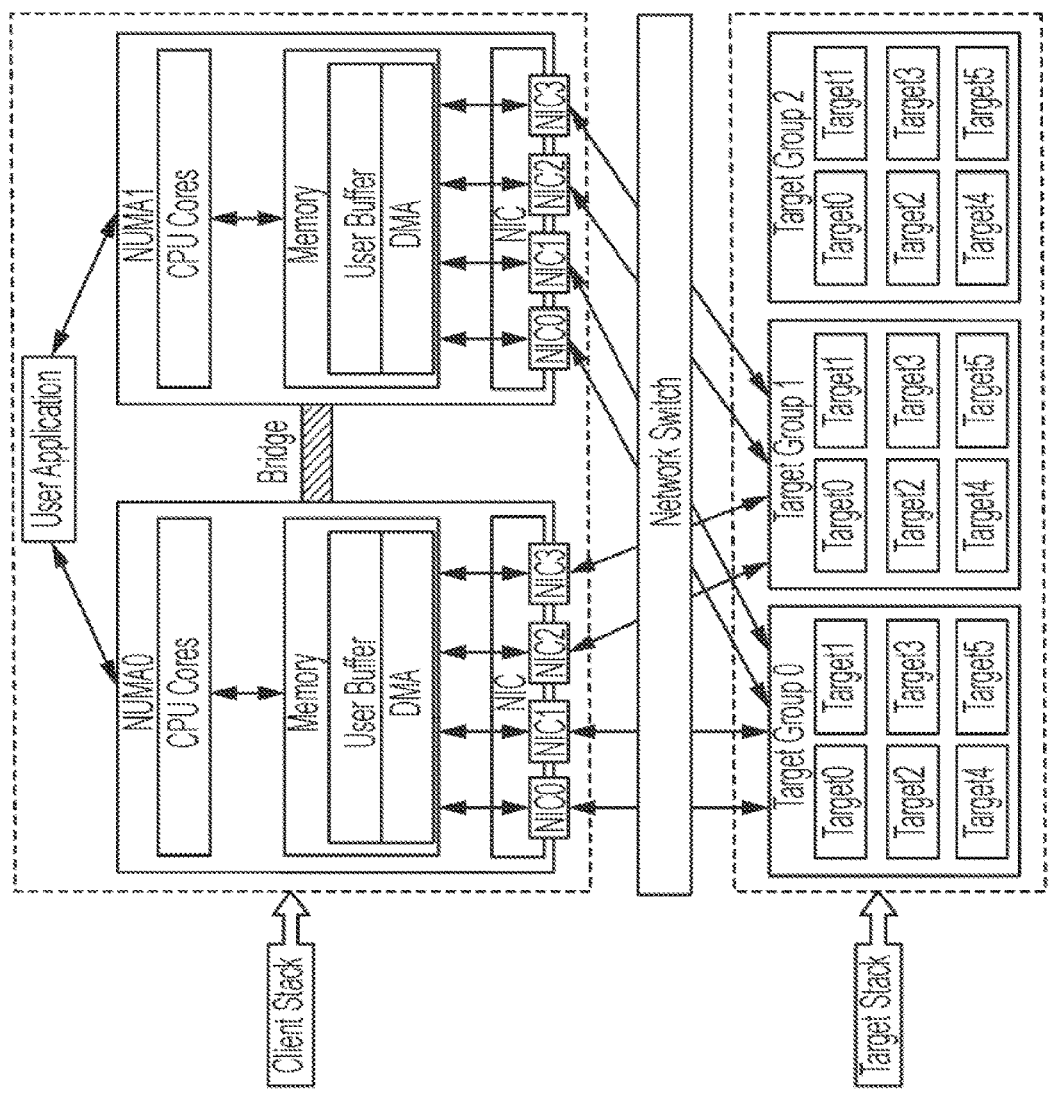
Figures 3, 4, 5, 6:
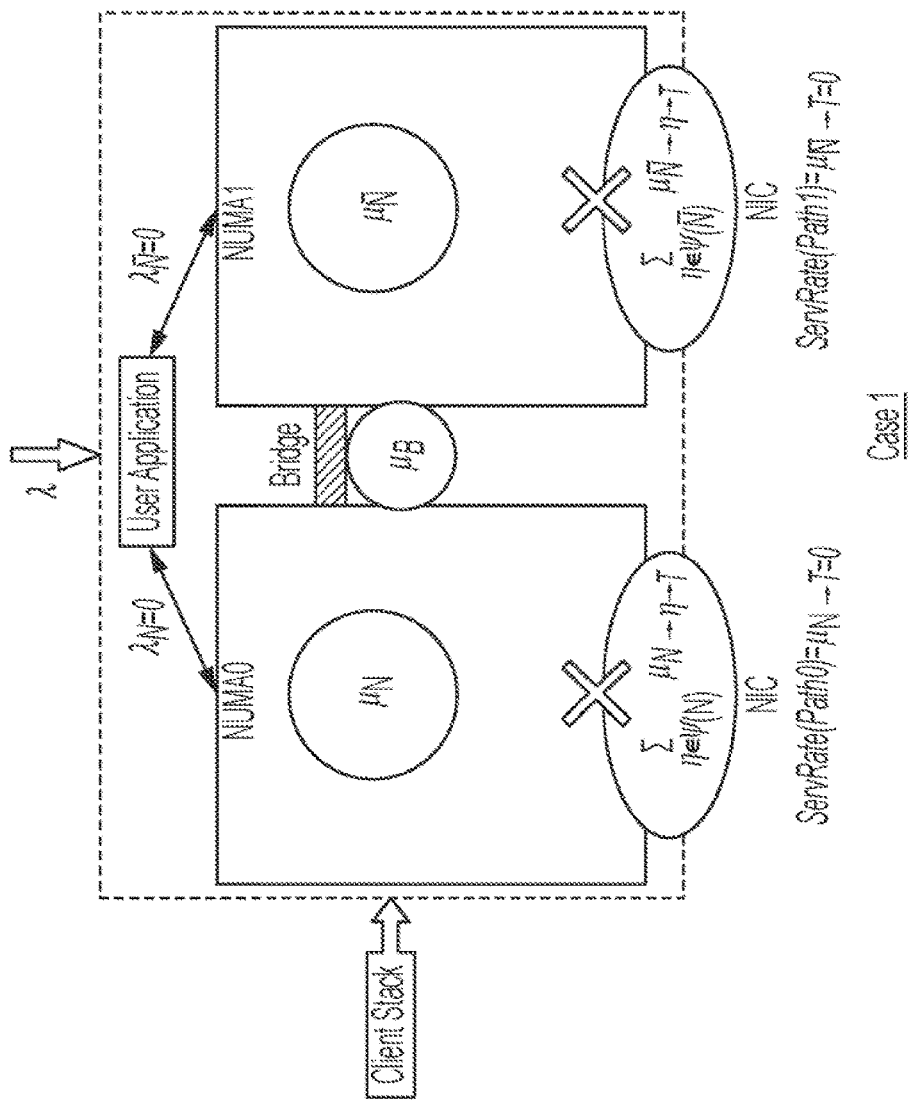
Figures 3, 4, 5, 6, 7:
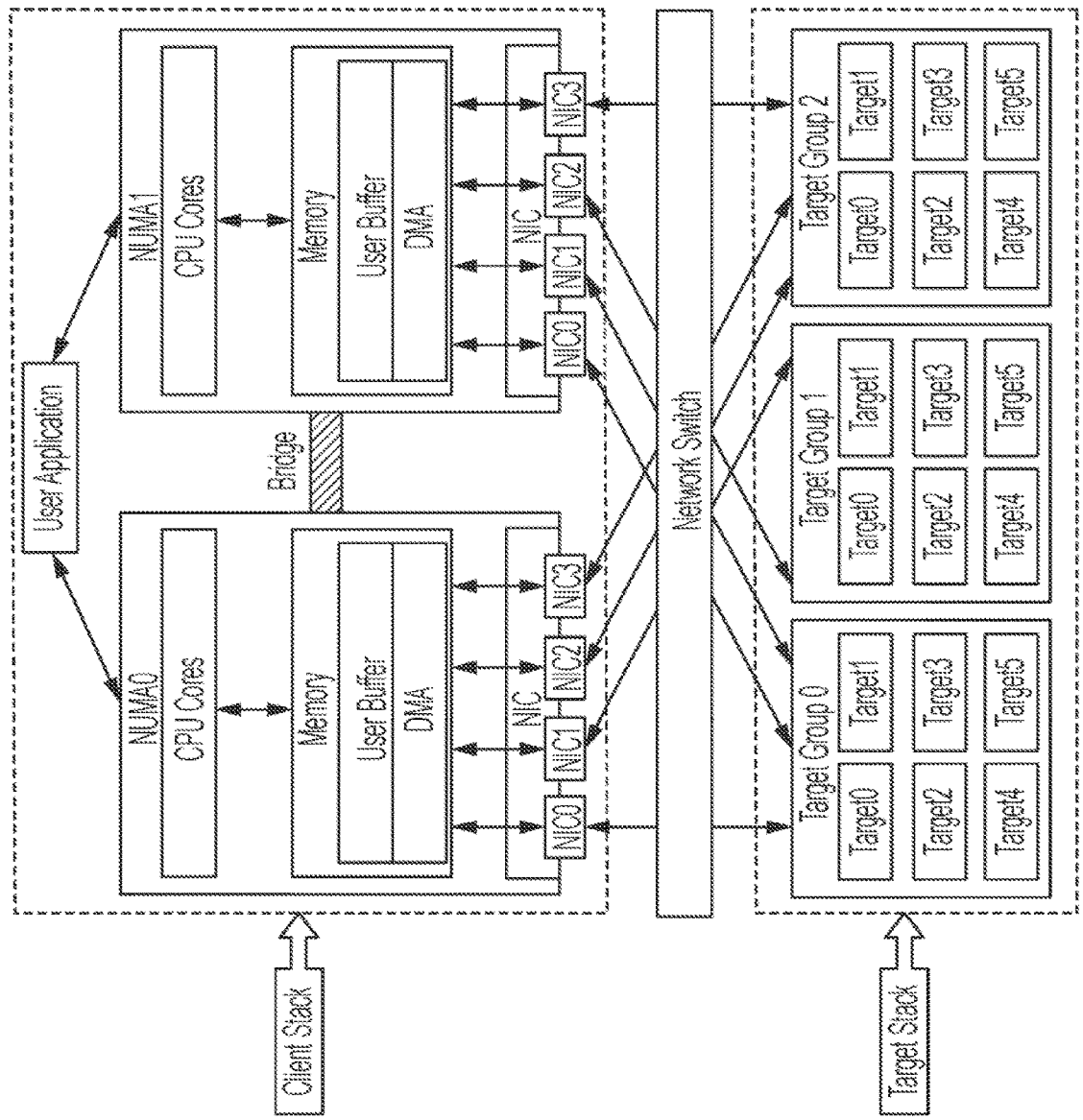
Figures 3, 4, 5, 6, 7, 8:
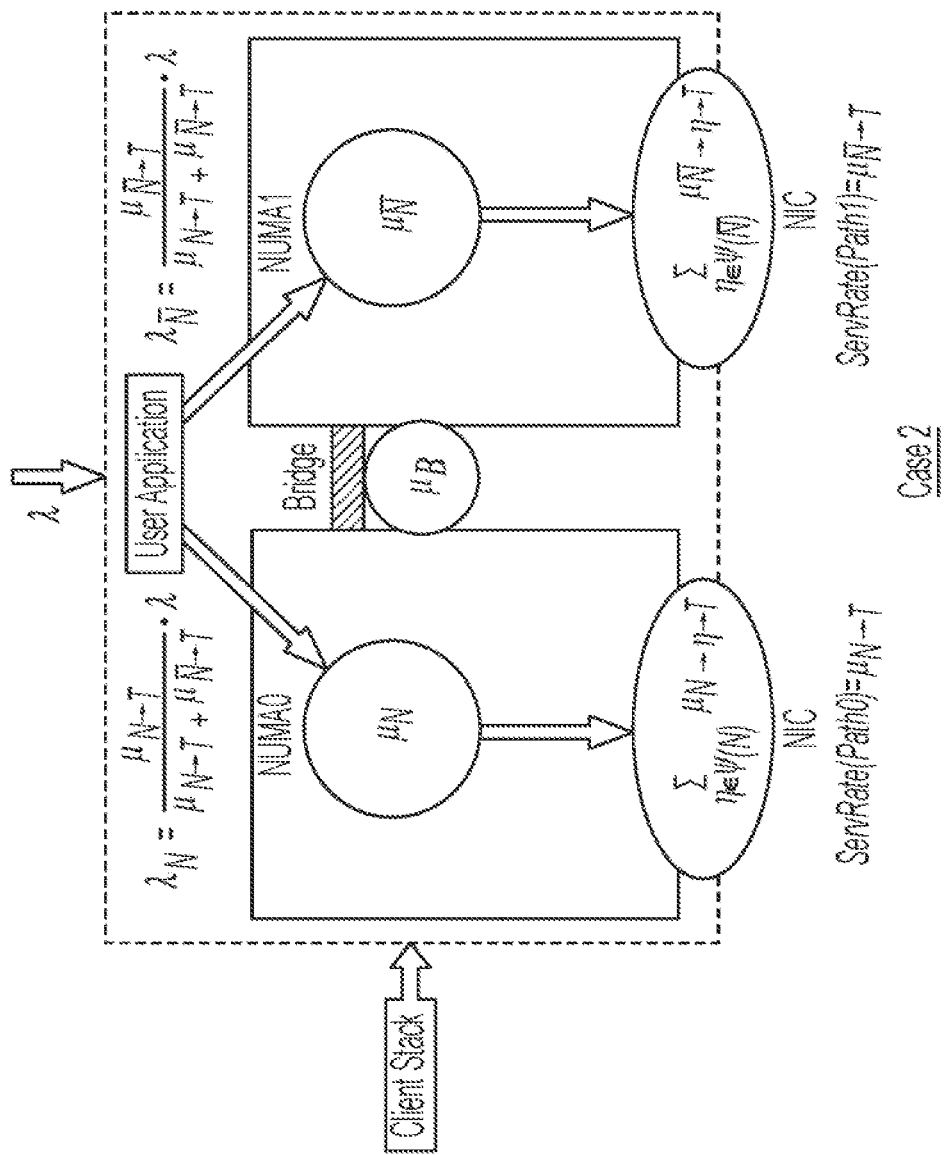
Figures 3, 4, 5, 6, 7, 8, 9:
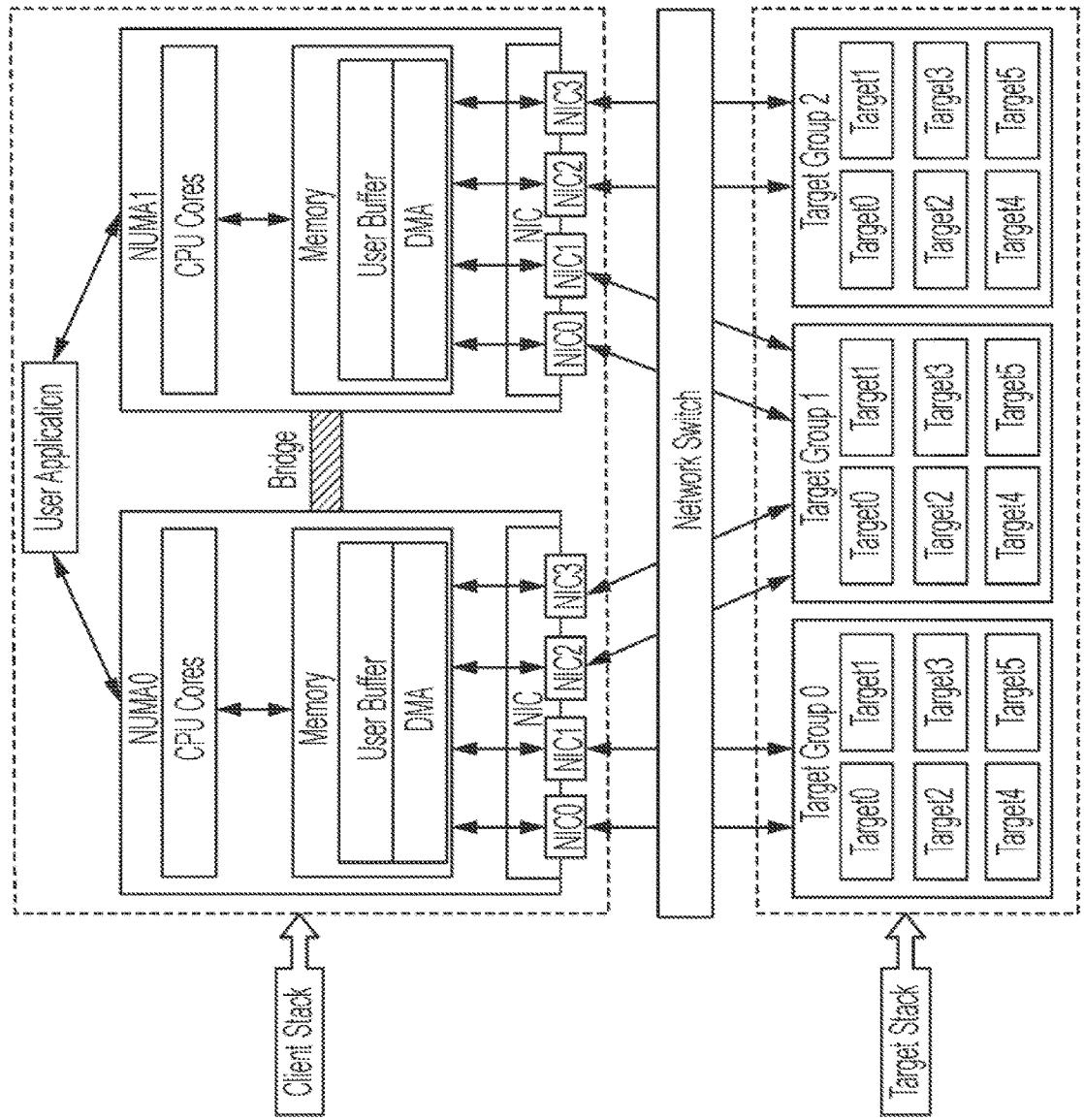
Figures 3, 4, 5, 6, 7, 8, 9, 10:
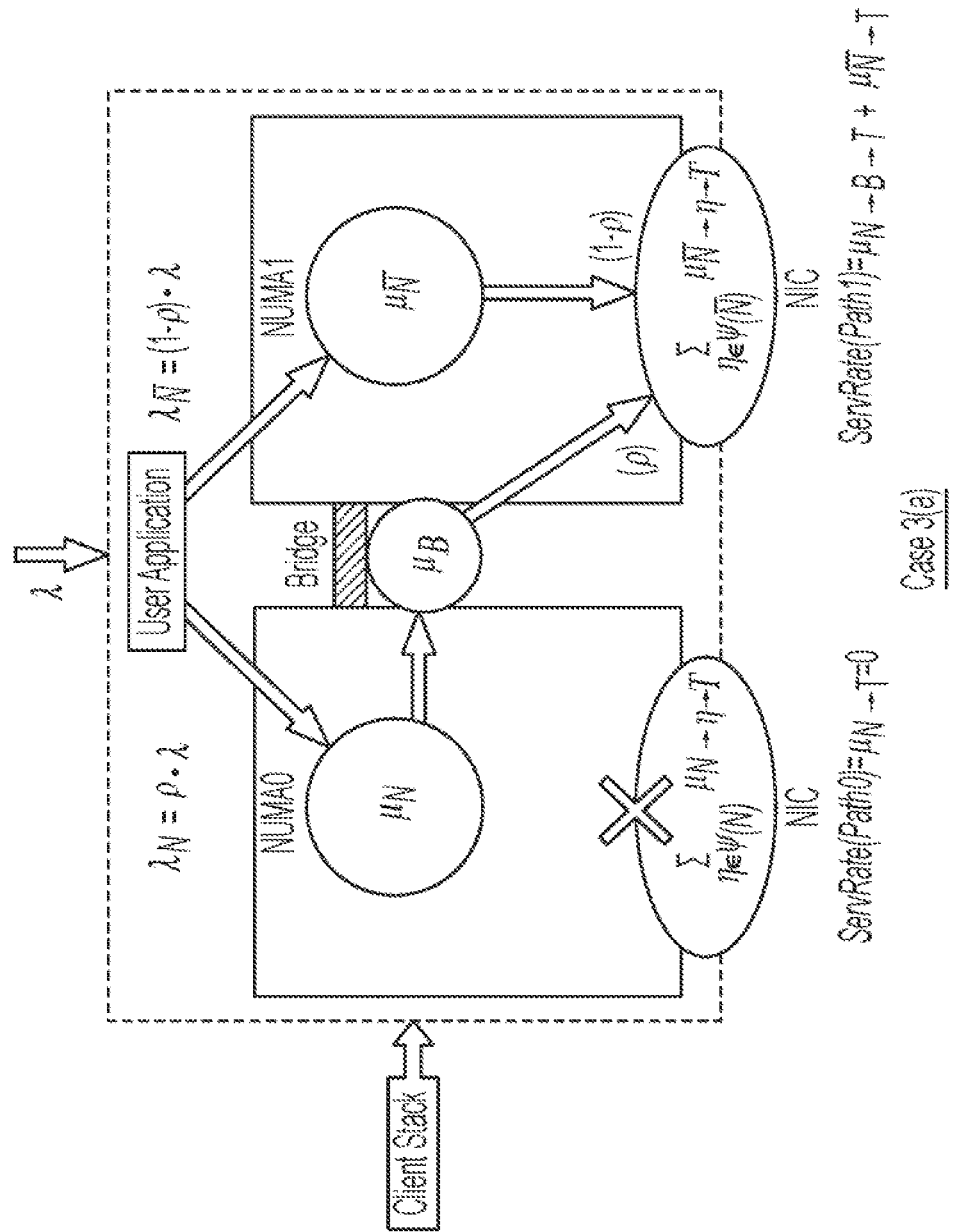
Figures 3, 4, 5, 6, 7, 8, 9, 10, 11:
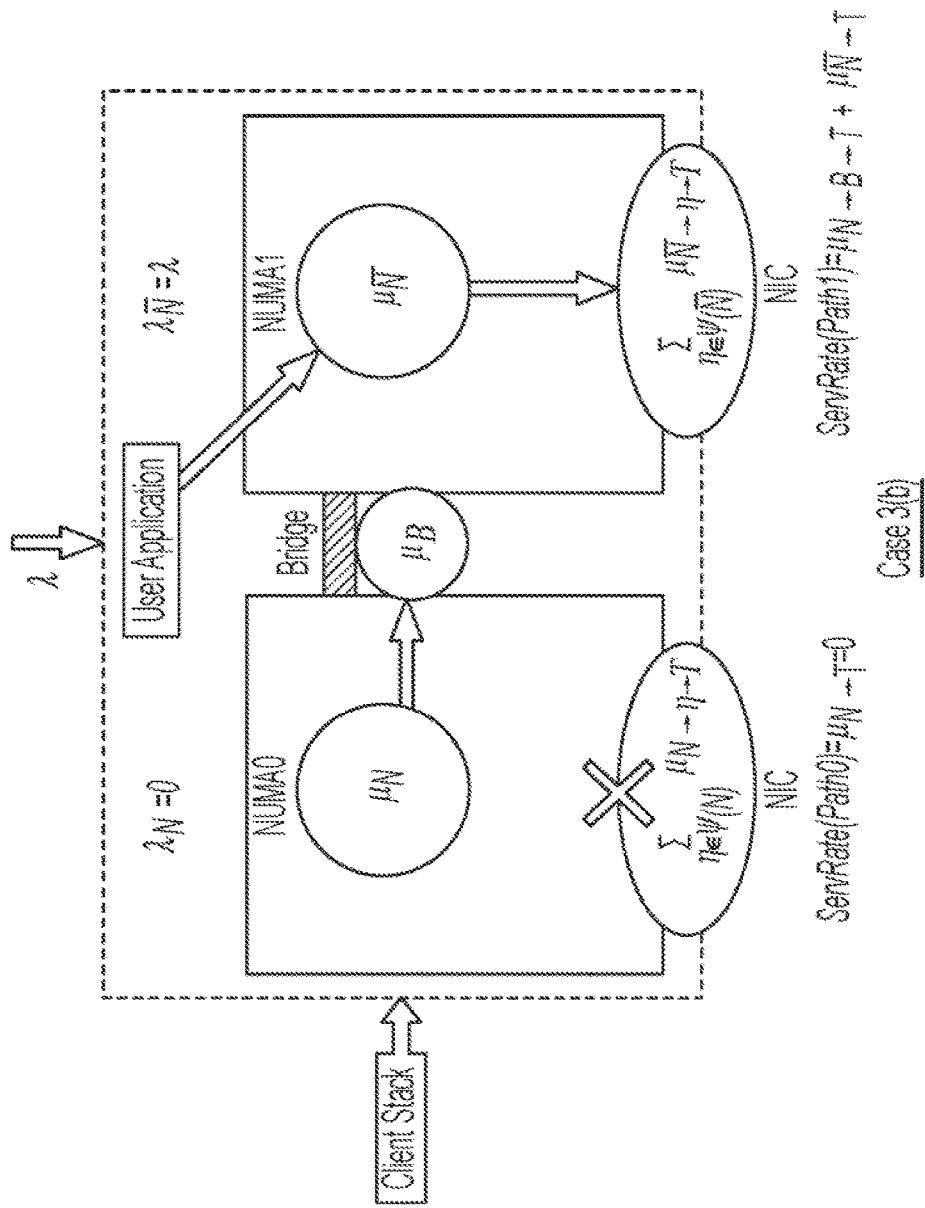
Figures 1, 4:
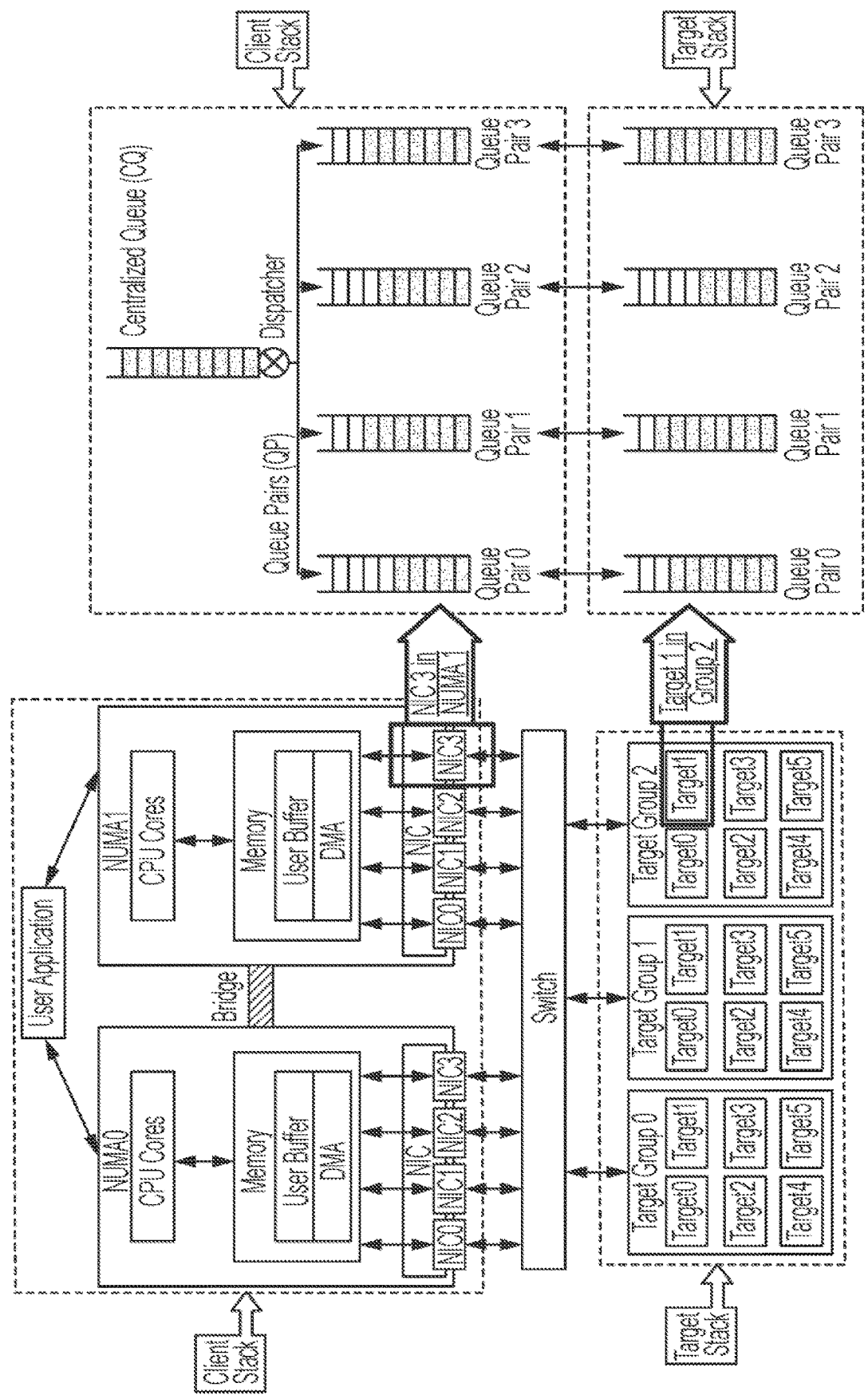
Figures 2, 4:
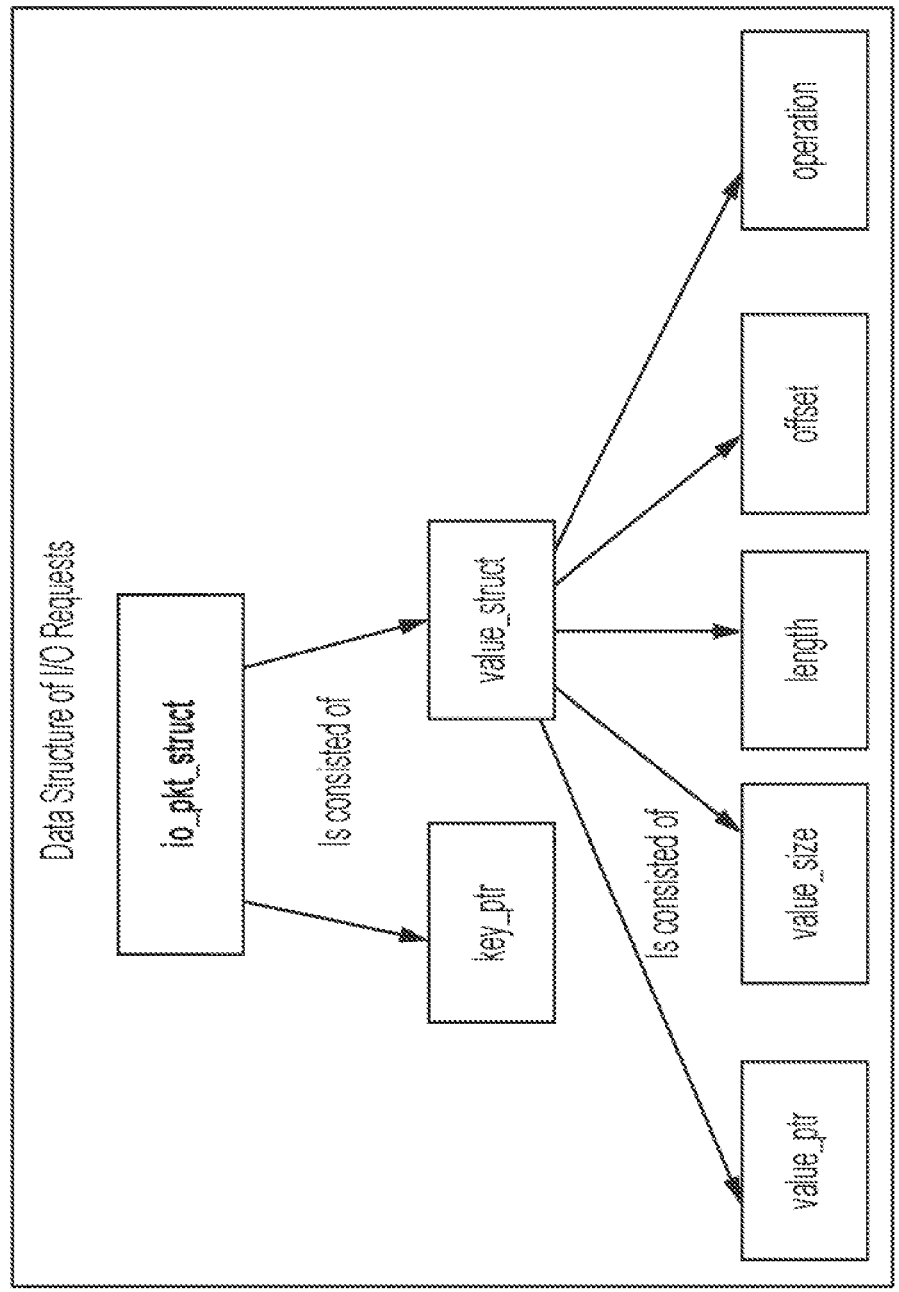
Figures 3, 4:
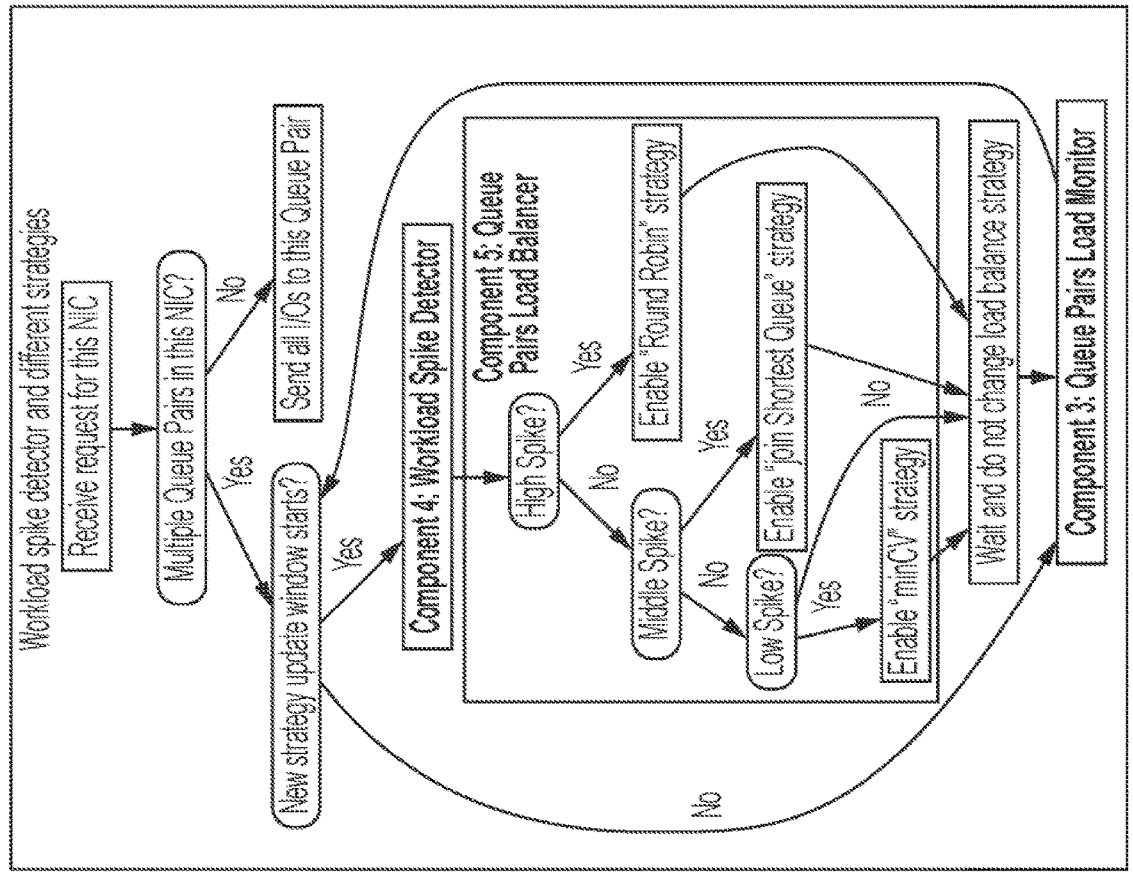
Figures 4, 5:
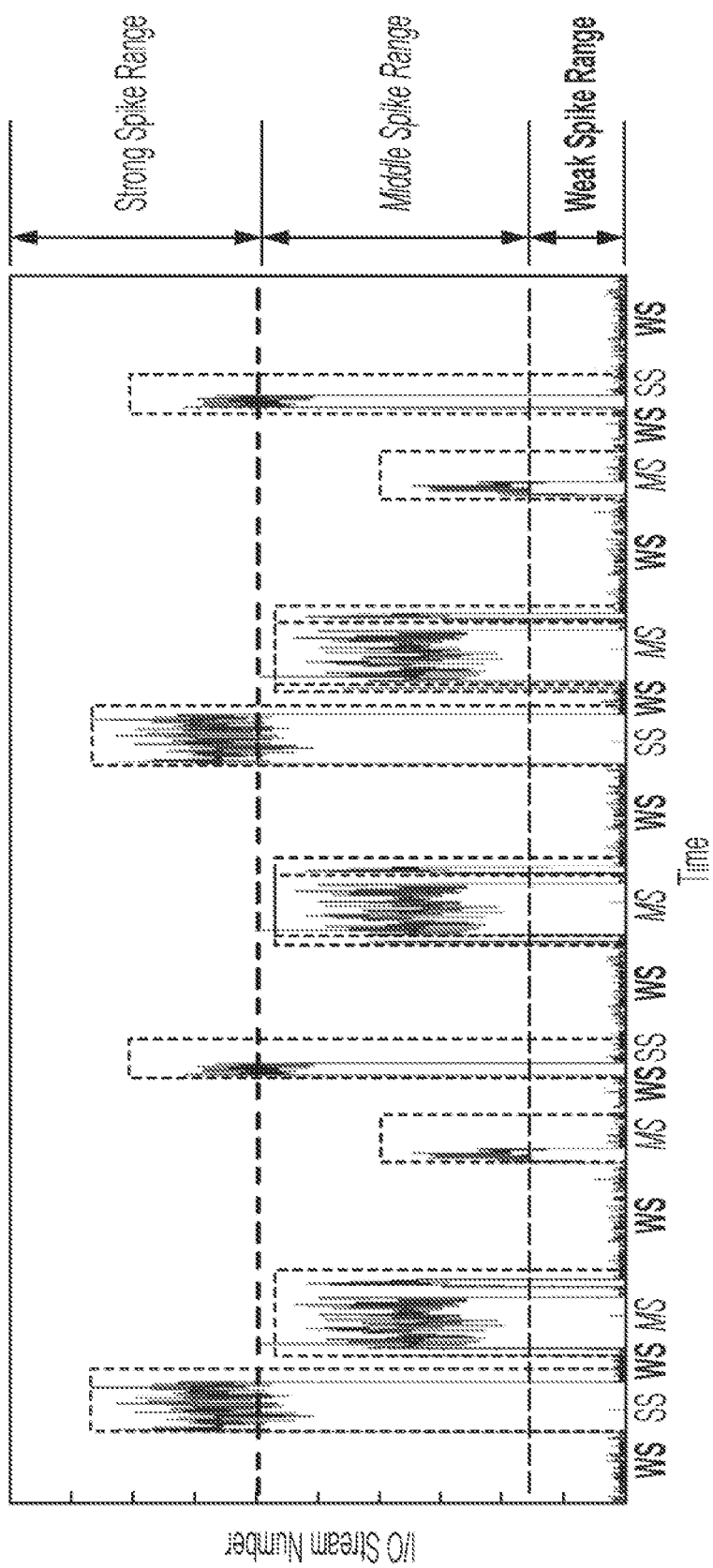
Figures 4, 5, 6:
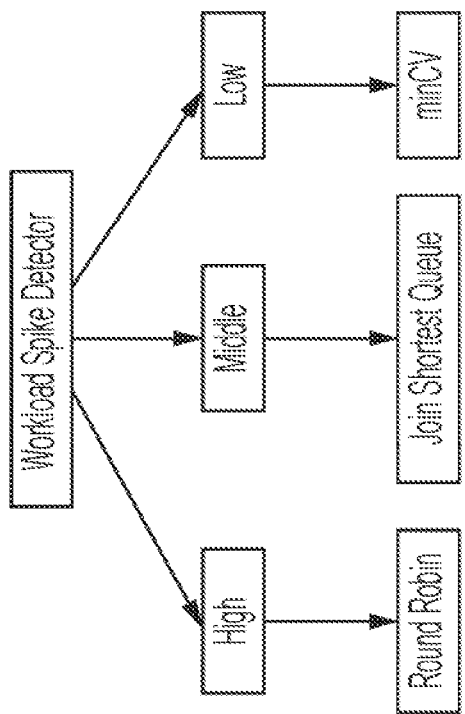

With the help a preset range of each spike degree type, the system for path selection and load balancing easily categorizes each I/O traffic of current epoch into one of three degrees. For example, FIG. 4-5 depicts a sample of the proposed SCV-autocorrelation based spike detection, where SS, MS, and WS represent Strong Spike, Middle Spike, and Weak Spike, respectively.

4.4 Component 5: Queue Pair Load Balancer

As mentioned above, a workload imbalance may cause resource underutilization and the overall system performance may be degraded.

One challenge during the load balance procedure is determining the extent to which we can "trust" the Queue Pair status information.

One cannot constantly gather all detailed information which triggers large overhead.

One also cannot simply rely on old Queue Pair status, since the out-of-date delay will mislead load balancing.

To overcome this challenge, the system for path selection and load balancing detects the spike degree and switches between three different strategies that have different "trust" degree on Queue Status information.

Intuitively, the Queue Pair status information gathered in high traffic I/O time is less trustable than that in low traffic time.

Details of three different load balancing strategies will be described in the following three subsections.

4.4.1 Case 1: Strong Spike Degree

Under the case that strong spikes (a large number of I/Os, detected by Component 4) are arriving (e.g., the workload spike degree exceeds a first threshold), we use one of the simplest dispatching methods—round robin. The reason is that under such high traffic period, getting the actual workload amount of each queue pair is costly, and the information may tend to be out-of-date due to high traffic. Such a delay will mislead the system by sending all I/Os to a previous lowest workload queue and result in saturating that Queue and leading to imbalance. In other words, we cannot trust the queue pair status info and we have no time to conduct complicated calculation on that much due to high traffic.

Round robin does not have any overhead for both getting queue status information and calculating balance degrees (i.e., no need to do both things). In the implementation, the system for path selection and load balancing keeps the previous queue pair number k, and adds one for each new I/O request. If it exceeds the boundary, we let it go back to zero (since queue pair number is from 0 to $N_q-1$), as:

$$k = \begin{cases} k+1, & k \in [0, N_q - 2] \\ 0, & k = N_q - 1 \end{cases} \quad \text{Eq. 4-4}$$

As we can see from Eq. 4-4, the left-hand-side k is the next round selection of k to assign the new I/O, and this k is actually based on its own previous value (k+1). It may be seen that round robin is independent on the characteristics of the new I/O request. The only constraint is that we need to make sure that the selected queue pair is not full (i.e., at least has one slot for the new I/O request), as:

$$|k| < |k|_{max} \quad \text{Eq. 4-5}$$

Where, $|k|$ means the number of queued I/Os in queue pair k, and $|k|_{max}$ means the preset queue size of queue pair k (e.g., the max number of I/Os that are allowed to be queued in queue pair k).

4.4.2 Case 2: Middle Spike Degree

Under the middle spike degree situation (e.g., when the workload spike degree exceeds a second threshold and does not exceed the first threshold), the delay of queue status information and actual queue status is smaller than that of high spike degree epochs. That being said, the system for path selection and load balancing now is allowed to "trust" the delayed queue status information more than the high spike, and it also has a "little more time" to get and utilize more detailed queue status information.

As a result, the system for path selection and load balancing uses the "Join Shortest Queue (JSQ)" strategy. JSQ strives to balance the load across the Queue Pairs reducing the probability of one Queue Pair having several I/Os while others are idle. There are two options for implementing join shortest queue strategy, we do not limit the usage of either of them. The overall guideline is that if the overall system utilization ratio is very high, then option 1 is enough to handle the JSQ; otherwise, option 2 may be used to provide a more accurate dispatching.

Option 1: Straightforward Implementation

Simply using the number of queued I/Os to represent workload amount is a fast operation which can meet the JSQ's request. The tradeoff is that it may not be so accurate since it does not consider the difference of I/Os. Eq. 4-6 shows the procedure which assigns the incoming request to the Queue Pair with the least number of queued I/O requests, which returns the queue pair k that the sum of "its currently queued I/O number" and "1 (for the one new I/O request we might assign to this queue pair)" is the lowest. Meanwhile we also need to make sure that each queue pair is not full before adding this new I/O request, same as Subsection 4.4.1

$$\text{min: } |k| + 1 \qquad \text{Eq. 4-6}$$
$$\text{s.t.: } |k| < |k|_{max}$$

As a greedy approach, which can also be written in the following way: given a set of Queue Pairs Q, find the k as:

$$\underset{k \in \{Q\}}{\text{argmin}} \, (|k| + 1) \qquad \text{Eq. 4-7}$$

Option 2: Actual Workload Amount Conversion Implementation

To reflect the actual workload amount of each Queue Pair more accurately, the second implementation further calculates actual workload amount of each Queue Pair as well as adding the new I/O's (converted) actual workload amount.

We first define the total actual workload amount of all I/O requests queued in the Queue Pair q, when the new I/O request i is assigned to Queue Pair k. Given k, we can calculate queue pair q's total amount of workload (denoted as "$l_{<q,k,j>}$"), as:

$$\ell_{<q,k,i>} = \begin{cases} \sum_{j \in \{q\}} \tau_{<j,q>}, & k \neq q \\ \left( \sum_{j \in \{q\}} \tau_{<j,q>} \right) + \tau_{<i,q>}, & k = q \end{cases} \qquad \text{Eq. 4-8}$$

The reason that $l_{d<Q,k,i>}$ is a piecewise function in Eq. 4-8 is that we need to count the new I/O request's amount of workload $$\text{"} \sum_{j \in \{q\}} \tau_{<j,q>} \text{"},$$

when the queue pair q is selected to receive the new I/O k with the amount of workload "$\tau_{<i,q>}$". In other words, given a queue pair k, and the new I/O's allocation queue pair q, Eq. 4-8 provides a function to calculate the total workload amount of this queue pair k with the consideration of whether the new I/O is allocated to this queue pair (k=q) or not (k≠q). It may be seen that k may be the same or not the same as Queue Pair q based on whether queue pair k is selected to receive I/O k or not.). Based on Eq. 4-8, we develop an optimization framework to find the k where the lowest queue (including the newly added I/O if the queue is not full) as shown in Eq. 4-9. It assigns the incoming request to the Queue Pair with the least actual workload amount of queued requests. In detail, $l_{<k,k,i>}$ means queue pair k is selected to receive the new I/O request i. $l_{<k,k,i>}$ is the sum of "the total amount of workload of its queued I/Os $$\left( \sum_{j \in \{k\}} \tau_{<j,k>} \right)\text{,}"$$

and "the new I/O request's total amount of workload" ($\tau_{<i,k>}$). In plain words, in option 2, we treat queued I/Os and the new I/O based on their estimated workload, rather than number of I/Os.

$$\text{min: } \ell_{<k,k,i>} = \left( \sum_{j \in \{k\}} \tau_{<j,k>} \right) + \tau_{<i,k>} \qquad \text{Eq. 4-9}$$
$$\text{s.t.: } |k| < |k|_{max}$$

Similarly, we can also write this into the following way: Given a set of Queue Pairs Q and the new I/O request i, find the k as:

$$\underset{k \in \{Q\}}{\text{argmin}} \, \ell_{<k,k,i>} \qquad \text{Eq. 4-10}$$

4.4.3 Case 3: Weak Spike Degree

During the weak degree situation (e.g., when the workload spike degree is less than the second threshold), the system for path selection and load balancing "has time" to conduct a "full" optimization which considers both (1) actual workload amount and (2) a more accurate balance degree measurement. For requirement 1, we can use Eqs. 4-1 and 4-2. For requirement 2, to use standard deviation (i.e., the square root of the variance) is a common method but it is coupled with the "same units" (i.e., the absolute number of inputs) as the mean is.

To decouple them, we use "Coefficient of Variation" (CV, denoted as Ω here), also known as "Relative Standard Deviation (RSD)" to evaluate the dispersion of the Queue Pair workload distribution. Basically, CV is the ratio of the Standard Deviation to the mean. We show the calculation of CV as follows.

First, for any given k (as the selected Queue Pair to try assigning the I/O request), the system for path selection and load balancing calculates the mean total actual workload amount of all I/O requests queued in all Queue Pairs in the Queue Pair set Q:

$$\overline{\ell_{<Q,k,i>}} = \frac{\sum_{q \in Q} \ell_{<q,k,i>}}{N_q} \qquad \text{Eq. 4-11}$$

The system for path selection and load balancing then calculates CV by dividing the Standard Deviation to the mean it just calculated in Eq. 4-11:

$$\Omega_{<Q,k,i>} = \sqrt{\frac{\sum_{q \in Q} (\ell_{<q,k,i>} - \overline{\ell_{<Q,k,i>}})^2}{\frac{N_q}{\ell_{<Q,k,i>}}}} \qquad \text{Eq. 4-12}$$

This means by given a selected Queue Pair k to accept the new I/O request i, the balance degree of all Queue Pairs in the set Q after the new I/O is added to k is $\Omega_{<q,k,i>}$. A smaller CV value indicates a better load balancing result in the NIC port. Based on this, we present the "minCV" strategy which aims to minimize imbalance degree as shown in Eq 4-13.

$$\min: \Omega_{<Q,k,i>} = \sqrt{\frac{\sum_{q \in Q}(\ell_{<q,k,i>} - \overline{\ell_{<Q,k,i>}})^2}{N_q}} \quad \text{Eq. 4-13}$$

s.t.:

$q, k \in Q$ $|q| \leq |q|_{max}$ $|k| < |k|_{max}$

This is an optimization framework to minimize the objective function under three constraints. The first constraint ensures that q (iterated Queue Pair) and k (Queue Pair to assign the new I/O) should be in the set of all available Queue Pairs in the NIC port. The second and third constraints ensure that Queue Pairs should not queue more than their preset queue capacity in the unit of I/O request numbers.

We call this optimization framework as "minCV" since it is trying to minimize the CV of Queue Pair actual workload amounts. In other words, it is trying to find the k to achieve the minimal value of CV, as:

$$\operatorname*{argmin}_{k \in Q_{<Q,k,i>}} \Omega \quad \text{Eq. 4-14}$$

Some or all of the operations described herein may be performed by one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for intelligent path selection and load balancing have been specifically described and illustrated herein, many modifications and variations will be apparent to those skilled in the art. Accordingly, it is to be understood that a system and method for intelligent path selection and load balancing constructed according to principles of this disclosure may be embodied other than as specifically described herein. The invention is also defined in the following claims, and equivalents thereof.

What is claimed is:

1. A method comprising:
   determining a service rate of a first processor to a first persistent storage target;
   determining a service rate of a second processor to the first persistent storage target; and
   transmitting an input-output request to at least one of the first processor or the second processor according to the determined service rates of the first and second processors,
   wherein the service rate of the second processor is determined based on at least a core service rate of the second processor, and a cross-bridge service rate for routing the input-output request from the second processor to the first persistent storage target through the first processor.

2. The method of claim 1, wherein the first processor and the second processor are connected to each other by a bridge, the second processor is connected to the first persistent storage target through the bridge, and the cross-bridge service rate corresponds to a service rate for using the bridge to communicate with the first persistent storage target.

3. The method of claim 2, wherein the service rate of the second processor to the first persistent storage target is determined according to a configuration in which the input-output request is routed to the first persistent storage target through the second processor, through the bridge, and through the first processor.

4. The method of claim 2, wherein the input-output request comprises a first input-output request and a second input-output request, and
   wherein the transmitting comprises:
      determining a first service rate for a configuration in which both the first and second input-output requests are transmitted to the first processor;
      determining a second service rate for a configuration in which one of the first and second input-output requests is transmitted to the first processor, and the other one of the first and second input-output requests is transmitted to the second processor; and
      transmitting the first and second input-output requests to the first processor in response to determining that the first service rate is greater than the second service rate.

5. The method of claim 2, wherein the input-output request comprises a first input-output request and a second input-output request, and
   wherein the transmitting comprises:
      determining a first service rate for a configuration in which both the first and second input-output requests are transmitted to the first processor;
      determining a second service rate for a configuration in which one of the first and second input-output requests is transmitted to the first processor, and the other one of the first and second input-output requests is transmitted to the second processor; and
      transmitting the one of the first and second input-output requests to the first processor and the other one of the first and second input-output requests to the second processor in response to determining that the first service rate is less than the second service rate.

6. The method of claim 1, wherein the input-output request comprises a first input-output request and a second input-output request,
   wherein the first processor comprises a first network interface card and a second network interface card, and
   wherein the method further comprises:
      transmitting the first and second input-output requests to the first network interface card and the second network interface card in a round robin sequence.

7. The method of claim 1, wherein the first processor comprises a first network interface card comprising a first queue pair and a second queue pair, and the method further comprises:
   determining a workload spike degree corresponding to a measure of workload of the first network interface card according to centralized queue job numbers of the first network interface card; and
   selecting a strategy for assigning the input-output request to one of the first and second queue pairs of the first network interface card.

8. The method of claim 7, wherein the determining of the workload spike degree comprises calculating the workload spike degree according to:
   centralized queue queued job numbers at a first time and a second time;
   mean centralized queue queued job numbers at the first time and the second time; and
   a squared coefficient of variation.

9. The method of claim 7, further comprising:
   comparing the workload spike degree with a first threshold;
   estimating a length of the first queue pair; and
   assigning incoming input-output requests to queue pairs in the first network interface card in a round robin sequence in response to determining that the workload spike degree exceeds the first threshold.

10. The method of claim 9, further comprising:
    comparing the workload spike degree with a second threshold, the second threshold being less than the first threshold;
    determining a length of the second queue pair; and
    assigning an incoming input-output request to a shorter one of the first queue pair and the second queue pair in response to determining that the workload spike degree is less than the first threshold and greater than the second threshold.

11. A system comprising:
    a first persistent storage target;
    a first processor connected to the first persistent storage target;
    a second processor connected to the first persistent storage target through a bridge; and 53a centralized processing circuit configured to:
- determine a service rate of the first processor to the first persistent storage target;
- determine a service rate of the second processor to the first persistent storage target, the service rate of the second processor being determined according to at least a cross-bridge service rate for using the bridge to communicate with the first persistent storage target and a core service rate of the second processor; and
- transmit an input-output request to at least one of the first processor or the second processor according to the determined service rates of the first and second processors,
- wherein the service rate of the second processor to the first persistent storage target is determined according to a configuration in which the input-output request is routed to the first persistent storage target through the second processor, through the bridge, and through the first processor.

12. The system of claim 11, wherein the input-output request comprises a first input-output request and a second input-output request, and wherein the centralized processing circuit is configured to:
- determine a first service rate for a configuration in which both the first and second input-output requests are transmitted to the first processor;
- determine a second service rate for a configuration in which one of the first and second input-output requests is transmitted to the first processor, and the other one of the first and second input-output requests is transmitted to the second processor; and
- transmit the first and second input-output requests to the first processor in response to determining that the first service rate is greater than the second service rate.

13. The system of claim 11, wherein the input-output request comprises a first input-output request and a second input-output request, and
wherein the centralized processing circuit is configured to:
- determine a first service rate for a configuration in which both the first and second input-output requests are transmitted to the first processor;
- determine a second service rate for a configuration in which one of the first and second input-output requests is transmitted to the first processor, and the other one of the first and second input-output requests is transmitted to the second processor; and
- transmit the one of the first and second input-output requests to the first processor and the other one of the first and second input-output requests to the second processor in response to determining that the first service rate is less than the second service rate.

14. The system of claim 11, wherein the input-output request comprises a first input-output request and a second input-output request,
wherein the first processor comprises a first network interface card and a second network interface card, and
wherein the centralized processing circuit is configured to:
- transmit the first and second input-output requests to the first network interface card and the second network interface card in a round robin sequence.

15. The system of claim 11, wherein the first processor comprises a first network interface card comprising a first queue pair and a second queue pair, and the centralized processing circuit is configured to:
- determine a workload spike degree corresponding to a measure of workload of the first network interface card according to centralized queue job numbers of the first network interface card; and
- select a strategy for assigning the input-output request to one of the first and second queue pairs of the first network interface card.

16. The system of claim 15, wherein to determine the workload spike degree, the centralized processing circuit is further configured to calculate the workload spike degree according to:
- centralized queue queued job numbers at a first time and a second time;
- mean centralized queue queued job numbers at the first time and the second time; and
- a squared coefficient of variation.

17. The system of claim 15, wherein the centralized processing circuit is further configured to:
- compare the workload spike degree with a first threshold;
- determine a length of the first queue pair; and
- assign incoming input-output requests to queue pairs in the first network interface card in a round robin sequence in response to determining that the workload spike degree exceeds the first threshold.

18. The system of claim 17, wherein the centralized processing circuit is further configured to:
- compare the workload spike degree with a second threshold, the second threshold being less than the first threshold;
- determine a length of the second queue pair; and
- assign an incoming input-output request to a shorter one of the first queue pair and the second queue pair in response to determining that the workload spike degree is less than the first threshold and greater than the second threshold.

19. A system comprising:
a first persistent storage target;
a first processor connected to the first persistent storage target;
a second processor connected to the first persistent storage target through a bridge; and
a centralized processing circuit configured to:
- determine a service rate of the first processor to the first persistent storage target;
- determine a service rate of the second processor to the first persistent storage target, the service rate of the second processor being determined according to a cross-bridge service rate for using the bridge to communicate with the first persistent storage target; and
- transmit an input-output request to at least one of the first processor or the second processor according to the determined service rates of the first and second processors,
- wherein the service rate of the second processor to the first persistent storage target is determined according to a configuration in which the input-output request is routed to the first persistent storage target through the second processor, through the bridge, and through the first processor.

* * * * *